US012713362B2

(12) United States Patent
Gao

(10) Patent No.: US 12,713,362 B2
(45) Date of Patent: Aug. 18, 2026

(54) POWER HEADROOM REPORT REPORTING METHOD AND DEVICE AND STORAGE MEDIUM

(71) Applicant: Beijing Xiaomi Mobile Software Co., Ltd., Beijing (CN)

(72) Inventor: Xueyuan Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 297 days.

(21) Appl. No.: 18/681,292

(22) PCT Filed: Aug. 6, 2021

(86) PCT No.: PCT/CN2021/111253
§ 371 (c)(1),
(2) Date: Feb. 5, 2024

(87) PCT Pub. No.: WO2023/010548
PCT Pub. Date: Feb. 9, 2023

(65) Prior Publication Data
US 2024/0365252 A1 Oct. 31, 2024

(51) Int. Cl.
*H04W 52/36* (2009.01)
*H04W 72/0446* (2023.01)

(52) U.S. Cl.
CPC ..... *H04W 52/365* (2013.01); *H04W 72/0446* (2013.01)

(58) Field of Classification Search
CPC ............. H04W 52/365; H04W 52/146; H04W 52/367; H04W 52/34; H04W 24/10; H04W 72/21; H04W 88/02; H04W 76/27; H04W 52/54; H04W 52/346; H04W 72/23; H04W 52/242; H04W 52/325
(Continued)

(56) References Cited

U.S. PATENT DOCUMENTS

| | | | |
|---|---|---|---|
| 10,945,216 | B2 | 3/2021 | MolavianJazi et al. |
| 2020/0186304 | A1 | 6/2020 | Khoshnevisan et al. |

(Continued)

FOREIGN PATENT DOCUMENTS

| | | | |
|---|---|---|---|
| JP | 2020053982 | A | 4/2020 |
| WO | WO 2018090537 | A | 5/2018 |

(Continued)

OTHER PUBLICATIONS

Office Action issued by the Patent Office of the Russian Federation Federal Institute of Industrial Property on Aug. 30, 2024, in corresponding Application No. RU 2024104938/07, 6 pages.

(Continued)

*Primary Examiner* — Ajibola A Akinyemi
(74) *Attorney, Agent, or Firm* — Finnegan, Henderson, Farabow, Garrett & Dunner, L.L.P.

(57) ABSTRACT

A method for reporting a power headroom report (PHR) is performed by a terminal. The method includes: transmitting cooperatively physical uplink shared channels (PUSCHs) towards multiple transmission reception points (TRPs); measuring a power headroom (PH) on one or more cooperative TRPs; and reporting the PHR on the one or more cooperative TRPs according to the PH on the one or more cooperative TRPs.

18 Claims, 8 Drawing Sheets

S21 in response that the terminal does not transmit the PUSCH actually, the terminal measuring a PH of the PUSCH according to a default or predefined reference format corresponding to a single TRP or multiple TRPs as a calculation assumption

S22 reporting the PHR comprising the virtual PH corresponding to the PUSCH

(58) Field of Classification Search
USPC .......................................................... 455/522
See application file for complete search history.

(56) References Cited

U.S. PATENT DOCUMENTS

2020/0213955 A1 7/2020 Hosseini et al.
2021/0045070 A1* 2/2021 Yi ..................... H04W 72/0446

FOREIGN PATENT DOCUMENTS

WO WO 2020218900 A1 10/2020
WO 2021028892 A1 2/2021

OTHER PUBLICATIONS

"Summary #2 of Multi-TRP PUCCH and PUSCH Enhancements", Moderator (Nokia, Nokia Shanhai Bell), 3GPP TSG RAN WG1 #105-e, R1-2106074, e-Meeting, May 19-27, 2021, 46 pages.
"Multi-TRP enhancements for PDCCH, PUCCH and PUSCH", ZTE, 3GPP TSG RAN WG1 Meeting #104b-e, R1-2102661, e-Meeting, Apr. 12-20, 2021, 27 pages.
The First Office Action issued by the State Intellectual Property Office of People's Republic of China on Jul. 16, 2025, in corresponding Application No. CN 202180002405.7, 14 pages.
Extended European Search Report Issued on Application No. 21952422.0 dated Aug. 11, 2025, 20 pages.
"Open issues on PHR in dual connectivity", CATT, 3GPP TSG RAN WG1 Meeting #78, R1-142887, Dresden, Germany, Aug. 18-22, 2014, 5 pages.
"Enhancements on Multi-TRP for PUSCH and PUCCH", Xiaomi, 3GPP TSG-RAN WG1 Meeting #105-e, R1-2105541, e-Meeting, May 10-27, 2021, 15 pages.
Notice of Reasons for Refusal issued by the Japanese Patent Office on Nov. 26, 2024, in corresponding Application No. JP 2024-507167, 14 pages.
International Search Report and Written Opinion of International Application No. PCT/CN2021/111253, dated Apr. 27, 2022, 13 pages.
InterDigital, Inc., "Multi-TRP Enhancements for PUCCH and PUSCH", 3GPP TSG RAN WG1 #105-e, R1-2104293, e-Meeting, May 10-27, 2021, 5 pages.

* cited by examiner

| $C_7$ | $C_6$ | $C_5$ | $C_4$ | $C_3$ | $C_2$ | $C_1$ | R |
|---|---|---|---|---|---|---|---|
| P | V | PH (Type 2, PCell) | | | | | |
| R | R | $P_{CMAX,c}$ 1 | | | | | |
| P | V | PH (Type 1, PCell) | | | | | |
| R | R | $P_{CMAX,c}$ 2 | | | | | |
| P | V | PH (Type x, SCell 1) | | | | | |
| R | R | $P_{CMAX,c}$ 3 | | | | | |
| ... | | | | | | | |
| P | V | PH (Type x, SCell n) | | | | | |
| R | R | $P_{CMAX,c}$ m | | | | | |

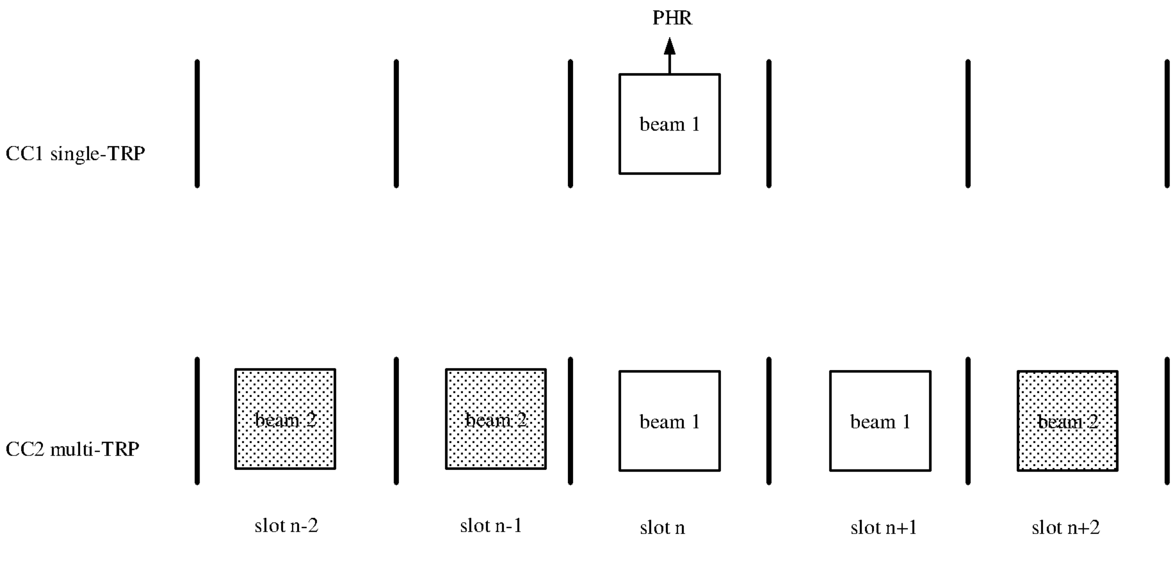

FIG. 5

S11 in response to the terminal transmitting cooperatively PUSCHs towards multiple TRPs, measuring and reporting a PHR on one or more cooperative TRPs

FIG. 6

S21 in response that the terminal does not transmit the PUSCH actually, the terminal measuring a PH of the PUSCH according to a default or predefined reference format corresponding to a single TRP or multiple TRPs as a calculation assumption

S22 reporting the PHR comprising the virtual PH corresponding to the PUSCH

FIG. 7

POWER HEADROOM REPORT REPORTING METHOD AND DEVICE AND STORAGE MEDIUM

CROSS-REFERENCE TO RELATED APPLICATION

This application is a US national phase of International Application No. PCT/CN2021/111253, filed on Aug. 6, 2021, the entire content of which is incorporated herein by reference.

TECHNICAL FIELD

The disclosure relates to the field of communication technologies, and more particularly, to a method and an apparatus for reporting a power headroom report, and a storage medium.

BACKGROUND

With the development of communication technologies, beam-based transmissions and receptions are needed to be performed to ensure the coverage range. When a network device (such as a base station) has multiple transmission reception points (TRPs), multiple TRPs/multiple panels may be used to provide services for terminals.

SUMMARY

According to a first aspect of the disclosure, a method for reporting a power headroom report (PHR) is provided. The method is performed by a terminal. The method includes: transmitting cooperatively physical uplink shared channels (PUSCHs) towards multiple transmission reception points (TRPs); measuring a power headroom (PH) on one or more cooperative TRPs; and reporting a PHR on the one or more cooperative TRPs according to the PH on the one or more cooperative TRPs.

According to a second aspect of the disclosure, a method for reporting a PHR is provided. The method is performed by a network device. The method includes: configuring a terminal to transmit cooperatively PUSCHs towards multiple TRPs; configuring the terminal to measure a PH on one or more cooperative TRPs and report a PHR on the one or more cooperative TRPs according to the PH on the one or more cooperative TRPs; and obtaining the PHR on the one or more cooperative TRPs, reported by the terminal.

According to the third aspect of the disclosure, a device for reporting a PHR is provided. The device includes: a processor; and a memory for storing processor-executable instructions. The processor is configured to perform the method for reporting the PHR described in the first aspect.

BRIEF DESCRIPTION OF THE DRAWINGS

The accompanying drawings herein, which are incorporated in and constitute a part of this specification, illustrate embodiments consistent with the disclosure and, together with the specification, serve to explain the principles of the disclosure.

FIG. 5 is a schematic diagram of a process for reporting a PHR MAC-CE under carrier aggregation according to some embodiments.

FIG. 6 is a flowchart illustrating a method for reporting a PHR according to some embodiments.

FIG. 7 is a flowchart illustrating a method for reporting a PHR according to some embodiments.

DETAILED DESCRIPTION

Reference will now be made in detail to embodiments, examples of which are illustrated in the accompanying drawings. The following descriptions refer to the accompanying drawings in which the same numbers in different drawings represent the same or similar elements unless otherwise represented. The implementations set forth in the following descriptions of embodiments do not represent all implementations consistent with the disclosure. Instead, they are merely examples of apparatuses and methods consistent with aspects related to the disclosure as recited in the appended claims.

Figure 1:
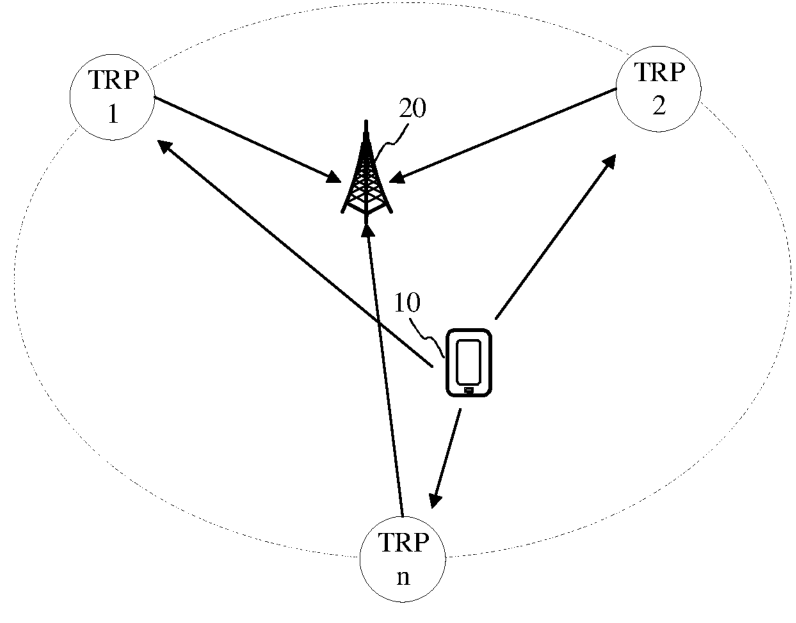
FIG. 1 is a schematic diagram of a wireless communication system according to some embodiments.

A method for reporting a power headroom report (PHR), according to embodiments of the disclosure, may be applicable to a wireless communication system illustrated in FIG. 1. Referring to FIG. 1, the wireless communication system includes a network device 20 and a terminal 10. The terminal is connected to the network device and performs data transmissions/receptions with the network device through wireless resources. The data transmissions/receptions are performed between the network device and the terminal according to beams. The physical uplink shared channel (PUSCH) uplink transmission enhancement may be performed between the network device and the terminal according to multiple transmission reception points (TRPs).

It should be understood that the number of TRPs that the network device performs data transmissions/receptions with the terminal according to the multiple TRPs may be one or more. The transmissions/receptions between the network device and the terminal according to TRP1, TRP2, . . . , TRPn in the wireless communication system in FIG. 1 is only for schematic illustration and is not limited thereto.

It should be understood that the wireless communication system in FIG. 1 is only for schematic illustration, and the wireless communication system may also include other network devices, such as a core network device, a wireless relay device, and a wireless backhaul device not illustrated in FIG. 1. The number of network devices and the number of terminals in the wireless communication system are not limited according to embodiments of the disclosure.

It should be further understood that the wireless communication system according to embodiments of the disclosure is a network that provides a wireless communication function. Wireless communication systems may adopt different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), or carrier sense multiple access with collision avoidance. Networks may be divided into a second generation (2G) network, a third generation (3G) network, a fourth generation (4G) network, or a future evolution network such as a fifth generation (5G) network, according to capacities, speeds, delays, and other factors of different networks. The 5G network may also be called a new radio (NR) network. For convenience of descriptions, a wireless communication network may be referred simply as a network sometimes according to the disclosure.

Further, the network device according to the disclosure may also be referred to as a wireless access network device. The wireless access network device may be a base station, an evolved base station (evolved node B), a home base station, an access point (AP) in a wireless fidelity (Wi-Fi™) system, a wireless relay node, a wireless backhaul node, a transmission point (TP), a transmission and reception point (TRP), or the like; may also be a next generation base station (gNB) in an NR system; and may also be a component or a part of devices that constitutes the base station. It should be understood that the specific technology and specific device form adopted by the network device according to embodiments of the disclosure is not limited herein. According to the disclosure, the network device may provide a communication coverage for a specific geographical area, and communicate with terminals located in the coverage area (cell). In addition, when it is a vehicle-to-everything (V2X) communication system, the network device may also be a vehicle-mounted device.

Further, the terminal according to the disclosure may also be referred to as a terminal device, a user equipment (UE), a mobile station (MS), a mobile terminal (MT), or the like. The terminal may be a device providing voice and/or data connectivity for users. For example, the terminal may be a handheld device with a wireless connection function, a vehicle-mounted device, or the like. Currently, examples of some terminals are mobile phones, customer premise equipments (CPEs), pocket personal computers (PPCs), personal digital assistants (PDAs), laptops, tablets, wearable devices, vehicle-mounted devices, or the like. In addition, when it is a V2X communication system, the terminal device may also be a vehicle-mounted device. It should be understood that the specific technology and specific device form adopted by the terminal according to embodiments of the disclosure is not limited herein.

According to the disclosure, data transmissions/receptions are performed between the network device and the terminal according to beams. The network device and the terminal may perform the uplink transmission enhancement according to the multiple TRPs, that is, the terminal may perform the uplink transmission enhancement by using a multi-point cooperative transmission technology, towards multiple TRP transmission directions.

The uplink enhancement scheme according to the multiple TRPs (the multi-TRP-based uplink enhancement scheme) may be based on the PUCCH/PUSCH repetition transmission scheme in the R16. The PUCCH uplink transmission scheme in the R16 supports repetition transmissions among slots. The uplink transmission scheme in the R16 supports, for the PUSCH of scheduling grant, repetition type A among slots and repetition type B across slots. The scheduled and scheduled-free PUSCH transmission are introduced respectively below.

For the scheduled PUSCH, there are two PUSCH uplink time-domain repetition transmission enhancement manners: repetition type A transmission scheme and repetition type B transmission scheme introduced in the R16.

1) PUSCH Repetition Type a Transmission Scheme

Figure 2:
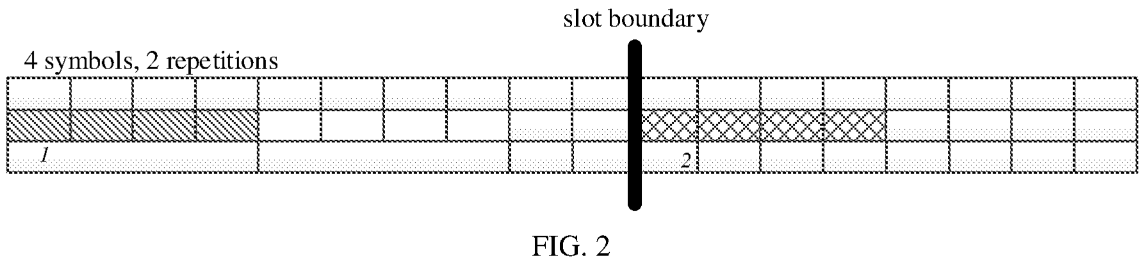
FIG. 2 illustrates an example diagram of PUSCH repetition type A according to some embodiments.

FIG. 2 is an example diagram of PUSCH repetition type A. As illustrated in FIG. 2, a PUSCH is transmitted in consecutive K slots, that is, K transmission occasions. A transmission starts at the $S^{th}$ symbol in the starting slot, and each transmission occasion lasts for L symbols. At the same time S+L may not exceed the slot boundary. The slot aggregation PUSCH transmission in the R16 is not suitable for some situations where the delay requirement is very low and the reliability requirement is high.

For the PUSCH repetition type A transmission scheme, the nominal transmission occasion (nominal repetition) is the actual transmission occasion (actual repetition).

2) PUSCH Repetition Type B Transmission Scheme

Figure 3A:
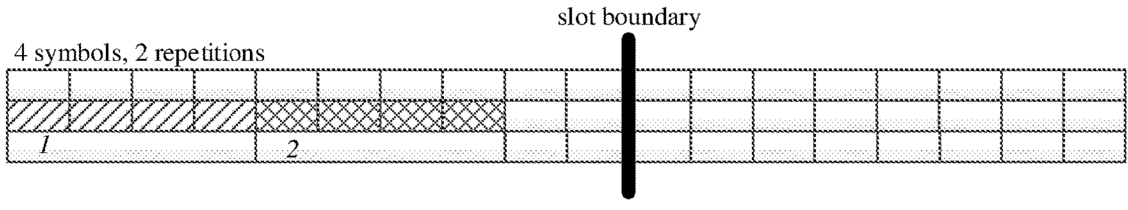
FIG. 3A to FIG. 3C illustrate example diagrams of PUSCH repetition type B according to some embodiments.
Figure 3B:
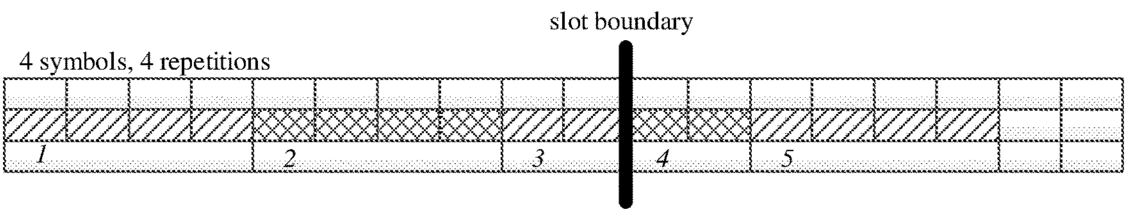
Figure 3C:
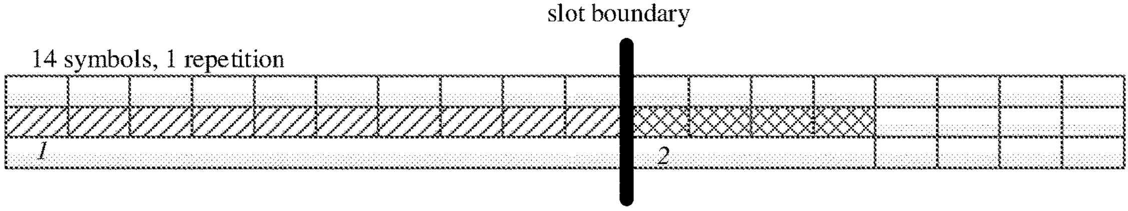

To reduce the delay and improve the reliability, the R16 supports the PUSCH repetition transmission scheme with the mini-slot as the unit, and allows the PUSCH transmission across slots to further reduce the delay. In the time domain, a PUSCH transmission starts at the $S^{th}$ symbol a in the starting slot, and continuously is performed on K nominal transmission occasions, and each nominal transmission occasion occupies L symbols continuously (back-to-back). S+L transmissions may cross slot boundaries. FIG. 3A to FIG. 3C illustrate examples of PUSCH repetition type B. FIG. 3A is an example of repetition transmission corresponding to K=2, L=4, and S=4. FIG. 3B is an example of repetition transmission corresponding to K=4, L=4, and S=4. FIG. 3C is an example of repetition transmission corresponding to K=1, L=14, and S=4.

As illustrated in FIG. 5A to FIG. 5C below, when the transmission occasion crosses the slot boundary, the transmission is re-segmented, corresponding to the number K' of actual transmissions, that is, the actual transmission occasions. For the entire transmission, the slot L*K represents the time window length of the PUSCH transmissions, and the DL symbols are discarded and not used for the PUSCH transmissions. The base station may indicate that the semi-static Flexible symbol is a dynamic uplink symbol or a dynamic downlink symbol through the slot format indicator (SFI), so the semi-static Flexible symbol may be an available symbol or an unavailable symbol for the PUSCH. When there are unusable symbols, the unusable symbols need to be discarded, and transmissions are performed on the remaining available symbols. The network device may also configure, through a signaling, unavailable symbol patterns that the terminal may not use, that is, the terminal does not transmit uplink data on the unavailable symbols indicated by the signaling.

The transmission parameters of PUSCH repetition type A and PUSCH repetition type B involved in the above are defined in the following table 1:

TABLE 1

| PUSCH | Normal cyclic prefix | | | Extended cyclic prefix | | |
|---|---|---|---|---|---|---|
| mapping type | S | L | S + L | S | L | S + L |
| Type A (repetition Type A only) | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} for repetition Type A, {1, . . . , 27} for repetition Type B | {0, . . . , 11} | {1, . . . , 12} | {1, . . . , 12} for repetition Type A, {1, . . . , 23} for repetition Type B |

Further, the uplink transmission of the terminal may be configured as the single-carrier transmission or the multi-carrier transmission. The configuration corresponding to the multi-carrier transmission includes the carrier aggregation (CA) configuration. When the terminal is configured with CA, it may include multiple cells, for example, a primary cell (PCell) and one or more secondary cells (SCells). In the current CA configuration, a downlink carrier has a corresponding uplink carrier.

Further, the uplink transmission configuration may also include a dual connectivity (DC) configuration. Under the DC configuration, when the terminal is configured with CA, it includes multiple cell groups: a master cell group (MCG) and a secondary cell group (SCG). The MCG includes 1 PCell and 0 or more SCells, and the SCG includes 1 PSCell and 0 or more SCells.

Further, the uplink transmission configuration may also include a supplementary uplink carrier (SUL carrier). In the 5G system, two uplink carriers may be configured for one downlink carrier, one of which is a supplementary uplink carrier and the supplementary uplink carrier may be configured for the PCell or SCell.

For the uplink transmission, a PHR needs to be reported for network scheduling requirements, and the PHR reflects the available power of the terminal, that is, the power headroom (PH). The terminal triggers to report the PHR according to trigger conditions stipulated in the protocol. The content reported in the PHR includes the following: the maximum power that can be transmitted on each cell, the power headroom after the terminal on each cell transmits an uplink control channel (such as PUCCH), the power headroom after the terminal on each cell transmits an uplink shared channel (such as PUSCH), or the power headroom after the terminal on each cell transmits an uplink sounding channel (such as a channel sounding reference signal (SRS)).

The current PHR measurement mechanism is classified into the actual PH measurement or the virtual PH measurement. When the terminal transmits the actual physical channel, it reports the power headroom (actual PHR) after the physical channel is actually transmitted. For example, when there is the PUSCH transmission, the terminal reports the actual PHR to the network device. When the terminal has no actual physical channel to transmit, it reports the power headroom (virtual PHR) after the physical channel reference (or virtual) transmission. For example, when there is no PUSCH transmission, the terminal calculates a PHR according to a predefined PUSCH format and transmits it to the network device, that is, a virtual PHR. The network may determine the bandwidth and transmission mode that the terminal may transmit according to the power headroom information of the terminal.

When the PHR is reported, it is reported based on the PHR medium access control—control element (MAC-CE).

Figure 4:
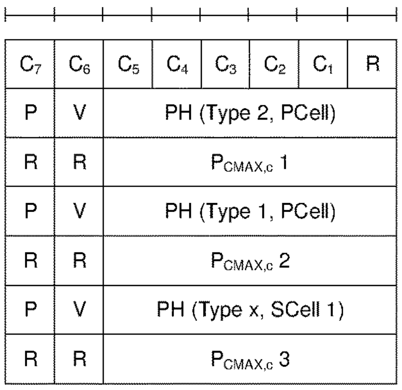
FIG. 4 is a schematic diagram of relevant fields in a PHR MAC-CE format according to some embodiments.

The reporting format of the PHR MAC-CE is illustrated in FIG. 4. The meanings of the relevant fields in the PHR MAC-CE format illustrated in FIG. 4 are as follows:

Ci: when one SCell is configured with SCellIndex through a radio resource control (RRC) message, this field indicates whether the PH field of the SCell configured with SCellIndex i is reported. Setting the Ci field to "1" indicates that the PH field of the SCell configured with SCellIndex i is reported. Setting the Ci field to "0" indicates that the PH field of the SCell configured with SCellIndex i is not reported.

R: a reserved bit, set to "0".

V: this field indicates whether the reported PH value is based on the actual transmission or the reference format. For Type 1 PH, V=0 indicates the actual transmission on the PUSCH, and V=1 indicates that the reference format of the PUSCH is used. For Type 2 PH, V=0 indicates the actual transmission on the PUCCH, and V=1 indicates that the reference format of the PUCCH is used. For Type 3 PH, V=0 indicates the actual transmission on the SRS, and V=1 indicates that the reference format of the SRS is used. In addition, for Type 1, Type 2, and Type 3 PH, V=0 indicates that the report format includes the corresponding $P_{CMAX,\,c}$ field corresponding to a certain cell, which corresponds to indicate the actual transmission on the PUSCH, and V=1 indicates that the report format does not include the $P_{CMAX,\,c}$ field corresponding to a certain cell, which corresponds to indicate that the reference format of the PUSCH is used.

PH: this field indicates the PH level.

P: this field indicates whether the current MAC entity adopts the power back-off mechanism. When there is no power back-off, and the $P_{CMAX,\,c}$ field corresponding to a certain cell has different values, the MAC entity sets P=1.

$P_{CMAX,\,c}$: when this field exists, it indicates the value of $P_{CMAX,\,c}$ used to calculate the corresponding PH field value, that is, the terminal calculates the maximum power that may be transmitted in this cell.

The PH types include Type 1 PH ($PH_{type1,\,c}(i)=P_{CMAX,\,c}-P_{PUSCH,\,c}(i)$), Type 2 PH ($PH_{type2,\,c}(i)=P_{CMAX,\,c}-P_{PUSCH,\,c}(i)-P_{PUCCH,\,c}(i)$), and Type 3 PH ($P_{Htype3,\,c}(i)=P_{CMAX,\,c}-P_{SRS,\,c}(i)$).

The index "i" involved in the above-mentioned PH types is a certain subframe "i". $P_{PUSCH,\,c}(i)$: is the transmit power of the PUSCH obtained by the terminal according to the calculation. When the terminal has an actual signal to transmit, this value is determined according to the actual transmit channel power. When the terminal has no actual signal to transmit, this value is determined according to the reference (or virtual) channel power. $P_{PUCCH,\ c}$ (i): is the transmit power of the PUCCH obtained by the terminal according to the calculation. When the terminal has an actual signal to transmit, this value is determined according to the actual transmit channel power. When the terminal has no actual signal to transmit, this value is determined according to the reference (or virtual) channel power. $P_{SRS,\ c}$(i): is the transmit power of the uplink SRS obtained by the terminal according to the calculation. When the terminal has an actual signal to transmit, this value is determined according to the actual transmit channel power. When the terminal has no actual signal to transmit, this value is determined according to the reference (or virtual) channel power.

In the multi-TRP-based uplink enhancement scheme, the terminal transmits the PHR only when the terminal is scheduled to transmit on the uplink shared channel (UL-SCH).

In the uplink transmission enhancement, Type 1 PH may be measured and the PHR may be reported to the network device. The PHR includes the PH and the maximum transmit power ($P_{cmax}$) on the carrier component. $P_{cmax}$ is configured by the network device explicitly. Since the network device may determine the coding and modulation scheme at the moment corresponding to the PHR and the resource size used by the terminal for transmissions, it may determine an effective combination of the modulation and coding scheme (MCS) and the allocated resource size. When there is no actual PUSCH transmission, the terminal may also report Type 1 PH.

In the multi-TRP-based uplink PUSCH transmission enhancement in the R17, power control processes for PUSCH transmissions towards different TRPs may be performed independently. Therefore, for the terminal, the PHR calculation values transmitted by different TRPs are different and the terminal may not be sure how to perform the measurement and report PHRs corresponding to multiple TRPs. Thus, when the network device performs the uplink scheduling, it may not sure how to use which PHR among different PHRs corresponding to multiple TRPs. For example, FIG. 5 illustrates a schematic diagram of a process for reporting a PHR MAC-CE under carrier aggregation. In the multi-TRP-based PUSCH transmission process, for the single-TRP transmission, the PH calculation is performed on carrier 1 and the PHR is reported. For the multi-TRP transmission on carrier 2, when the PHR MAC-CE timeline requirements are satisfied, for the TRP1 direction (beam 1), calculation is performed on the transmission occasion corresponding to #slot n to obtain the PH, and for the TRP2 direction (beam 2), it is not sure whether to use the transmission occasion corresponding to slot n−1 or use the transmission occasion corresponding to slot n+2 to calculate the PH. Therefore, in the multi-TRP-based uplink PUSCH transmission, for the PH measurement and PHR reporting, the specific reporting meaning of the available power needs to be specified in the protocol, so as to be used for the precise uplink scheduling by the network device.

According to embodiments of the disclosure, in the case that the terminal transmits cooperatively PUSCHs towards multiple TRPs, the terminal calculates and reports a PHR on one or more cooperative TRPs. According to embodiments of the disclosure, when the terminal performs uplink PUSCH transmissions based on multiple TRPs and the network device triggers the terminal configuration to use Type 1 PHR reporting, the PHR scheduling reference of each TRP among the multiple TRPs may be realized while satisfying the timeline requirements of the PHR calculation, enhancing the process of the PHR measurement and reporting. Through the enhancement of the PHR measurement and reporting, the PHR measurement and reporting for the multi-TRP-based PUSCH for different transmission manners may be realized, to better support the dynamic scheduling for different transmission manners, realize the precise power control, and realize the more effective allocation and utilization for network resources.

It should be understood that the method for reporting the PHR according to embodiments of the disclosure may also be applicable to other PHR reporting types such as Type 2 PHR and/or Type 3 PHR. The following uses Type 1 PHR as an example for illustration.

FIG. 6 is a flowchart illustrating a method for reporting a PHR according to some embodiments. The method for reporting the PHR may be performed alone or together with other embodiments of the disclosure. As illustrated in FIG. 6, the method for reporting the PHR is applied in a terminal and includes the following step.

In step S11, in response to the terminal transmitting cooperatively PUSCHs towards multiple TRPs, a PHR on one or more cooperative TRPs is measured and reported.

According to embodiments of the disclosure, the terminal transmitting the PUSCHs towards the multiple TRPs may be understood as the terminal performing the multi-TRP-based uplink PUSCH transmission. When the network device triggers the terminal to use Type 1 PHR to report, the PHR on the one or more cooperative TRPs may be measured and reported under the timeline requirements of the PHR calculation, and the PHR scheduling reference of each TRP in the multiple TRPs is realized.

According to embodiments of the disclosure, the terminal is configured to perform the virtual PH measurement or the actual PH measurement according to whether the terminal actually transmits the PUSCH and report the PHR corresponding to the virtual PH measurement or the actual PH measurement.

In an implementation, according to embodiments of the disclosure, when the terminal does not actually transmit the PUSCH, the virtual PH measurement may be performed.

FIG. 7 is a flowchart illustrating a method for reporting a PHR according to some embodiments. The method for reporting the PHR may be performed alone or in combination with other embodiments of the disclosure. As illustrated in FIG. 7, the method for reporting the PHR is applied in the terminal and includes the following steps.

In step S21, in response to that the terminal does not transmit the PUSCH actually, the terminal measures a PH of the PUSCH according to a default or predefined reference format corresponding to a single TRP or multiple TRPs as a calculation assumption.

According to embodiments of the disclosure, the reference format (also referred to as the reference transmission format) may be obtained through the channel measurement of the scheduling-free PUSCH, and applied to the PH of the scheduled PUSCH.

In an implementation according to embodiments of the disclosure, the default or predefined reference format corresponding to a single TRP (sTRP) may be used as a calculation assumption to measure the virtual PH of the PUSCH. In another implementation according to embodiments of the disclosure, the default or predefined reference format corresponding to multiple TRPs (mTRPs) may be used as a calculation assumption to measure the virtual PH of the PUSCH.

In step S22, the PHR including the virtual PH corresponding to the PUSCH is reported.

According to embodiments of the disclosure, in response to that the terminal does not actually transmit the PUSCH, it may measure the virtual PH and report the virtual PHR.

For example, according to embodiments of the disclosure, a PUSCH reference format is determined according to a reference cooperative transmission mode corresponding to transmitting cooperatively the PUSCHs towards the multiple TRPs, and the PHR including the virtual PH corresponding to the PUSCH is reported according to the PUSCH reference format.

For example, according to embodiments of the disclosure, the reference cooperative transmission mode corresponding to transmitting cooperatively the PUSCHs towards the multiple TRPs may be determined according to a predefined or default cooperative transmission mode of time-division multiplexing (TDM)/space division multiplexing (SDM)/frequency division multiplexing (FDM) and the like.

According to embodiments of the disclosure, when the terminal actually transmits the PUSCH, the actual PH measurement may be performed.

Figure 8:
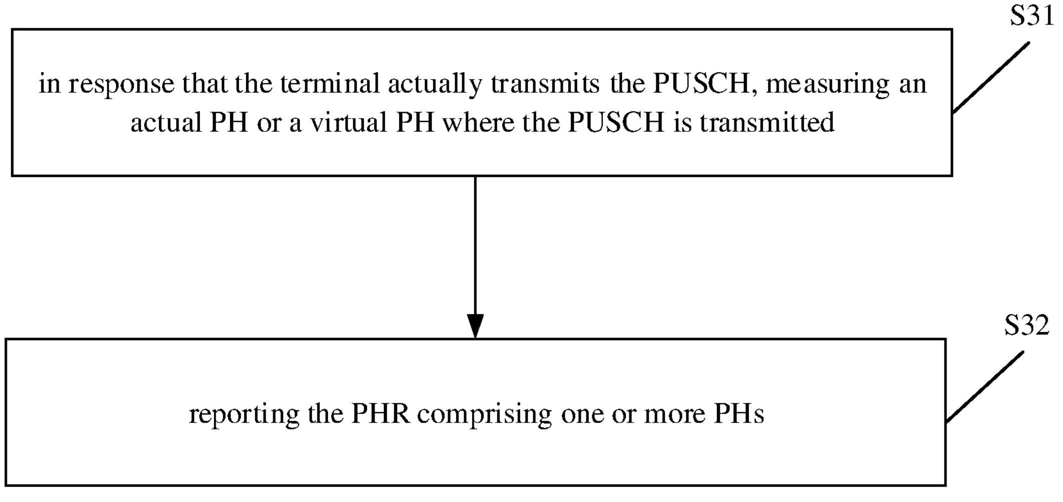
FIG. 8 is a flowchart illustrating a method for reporting a PHR according to some embodiments.

FIG. 8 is a flowchart illustrating a method for reporting a PHR according to some embodiments. The method for reporting the PHR may be performed alone or in combination with other embodiments of the disclosure. As illustrated in FIG. 8, the method for reporting the PHR is applied in the terminal and includes the following steps.

In step S31, in response to that the terminal actually transmits the PUSCH, an actual PH or a virtual PH where the PUSCH is transmitted is measured.

In step S32, the PHR including one or more PHs is reported.

According to embodiments of the disclosure, when performing the actual PH measurement, the terminal may determine the transmission occasion for measuring the actual PH according to whether the PUSCH for carrying the PHR MAC-CE and the actually scheduled PUSCH are located on the same carrier, and measure the actual PH where the PUSCH is transmitted on the transmission occasion.

For example, when the PUSCH for carrying the PHR MAC-CE and the actually scheduled PUSCH are located on the same carrier according to embodiments of the disclosure, the transmission occasion may be determined in a predefined manner. For example, the transmission occasion may be a first transmission occasion for PUSCH transmissions, a corresponding earliest transmission occasion for transmitting the scheduled PUSCH in a slot overlapping with the PUSCH for carrying the PHR MAC-CE, a transmission occasion corresponding to an earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE, multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE, or one or more predefined transmission occasions before a slot for reporting the PHR MAC-CE For example, when the PUSCH for carrying the PHR MAC-CE and the actually scheduled PUSCH are located on different carriers according to embodiments of the disclosure, and in the case of repetition transmission occasions, the transmission occasion for measuring the actual PH is determined according to a subcarrier spacing corresponding to an active bandwidth part (BWP) of a carrier for reporting the PHR MAC-CE and a subcarrier spacing corresponding to an active BWP of a carrier where the PUSCH is transmitted. For example, when the subcarrier spacing corresponding to the active BWP of the carrier for reporting the PHR MAC-CE is smaller than the subcarrier spacing corresponding to the active BWP of the carrier where the PUSCH is transmitted, the transmission occasion for measuring the actual PH is determined as a first transmission occasion for PUSCH transmissions, an earliest transmission occasion to be transmitted among transmission occasions for the scheduled PUSCH in a slot overlapping with the PUSCH for carrying the PHR MAC-CE, multiple transmission occasions for the scheduled PUSCH corresponding to a slot overlapping with the PUSCH for carrying the PHR MAC-CE, a transmission occasion corresponding to an earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE, multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE, or one or more predefined transmission occasions before a slot of the PUSCH for carrying the PHR MAC-CE. For another example, when the subcarrier spacing corresponding to the active BWP of the carrier for reporting the PHR MAC-CE is equal to the subcarrier spacing corresponding to the active BWP of the carrier where the PUSCH is transmitted, the transmission occasion for measuring the actual PH is determined as a first transmission occasion for PUSCH transmissions, an earliest transmission occasion among transmission occasions overlapping with a slot for reporting the PHR MAC-CE, a transmission occasion corresponding to an earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE, multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE, or one or more predefined transmission occasions before a slot for reporting the PHR MAC-CE.

According to embodiments of the disclosure, when the terminal transmits the PUSCH, it may schedule a single TRP for transmission, or schedule multiple TRPs for transmission, and select to report the PHR of one or more actual PHs according to whether the single TRP or multiple TRPs are scheduled.

Figure 9:
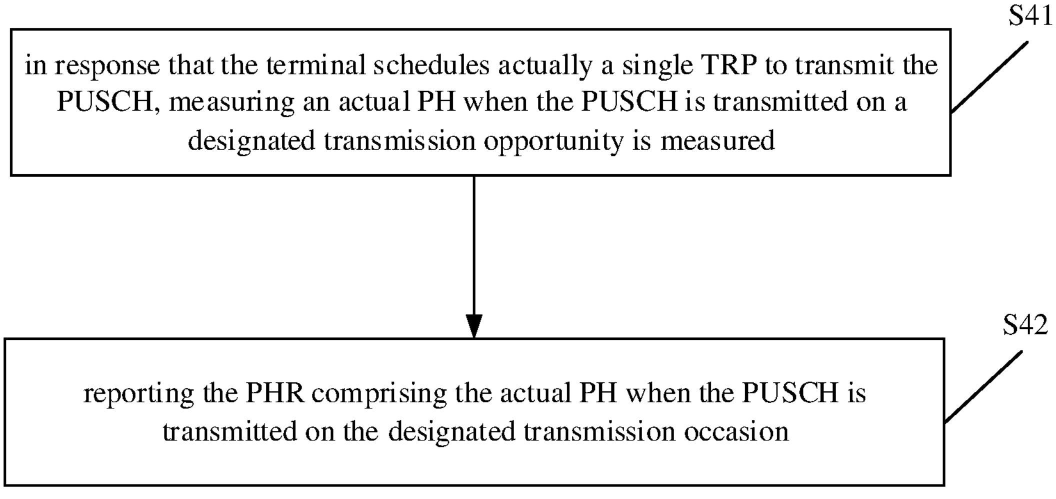
FIG. 9 is a flowchart illustrating a method for reporting a PHR according to some embodiments.

FIG. 9 is a flowchart illustrating a method for reporting a PHR according to some embodiments. The method for reporting the PHR may be performed alone or in combination with other embodiments of the disclosure. As illustrated in FIG. 9, the method for reporting the PHR is applied in the terminal and includes the following steps.

In step S41, in response to that the terminal schedules actually a single TRP to transmit the PUSCH, an actual PH when the PUSCH is transmitted on a designated transmission occasion is measured.

In step S42, the PHR including the actual PH when the PUSCH is transmitted on the designated transmission occasion is reported.

According to embodiments of the disclosure, in the case of actually scheduling the single TRP to transmit the PUSCH, the PHR including the single actual PH may be reported.

Furthermore, according to embodiments of the disclosure, in the case of actually scheduling the single TRP to transmit the PUSCH, the above-mentioned designated transmission occasion for the actual PH measurement may include the following situations.

One. A PUSCH for carrying a PHR MAC-CE and the actually scheduled PUSCH are located on a same carrier, and the designated transmission occasion is one of the following transmission occasions in A~E.

A: A first transmission occasion for PUSCH transmissions.

B: A corresponding earliest transmission occasion for transmitting the scheduled PUSCH in a slot overlapping with the PUSCH for carrying the PHR MAC-CE.

C: A transmission occasion corresponding to an earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE.

D: Multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE.

E: One or more predefined transmission occasions before a slot for reporting the PHR MAC-CE.

Two. The PUSCH for carrying the PHR MAC-CE and the actually scheduled PUSCH are located on different carriers, and the designated transmission occasion may use the same slot as the actual PHR measurement and the PHR MAC-CE.

When the PUSCH for carrying the PHR MAC-CE and the actually scheduled PUSCH are located on different carriers, the designated transmission occasion is determined according to a subcarrier spacing corresponding to an active BWP of a carrier for reporting the PHR MAC-CE and a subcarrier spacing corresponding to an active BWP of a carrier where the PUSCH is transmitted.

(1) When the subcarrier spacing corresponding to the active BWP of the carrier for reporting the PHR MAC-CE is smaller than the subcarrier spacing corresponding to the active BWP of the carrier where the PUSCH is transmitted, the designated transmission occasion may be one of the following transmission occasions in A to F.

A: A first transmission occasion for PUSCH transmissions.

B: An earliest transmission occasion to be transmitted among transmission occasions for the scheduled PUSCH in a slot overlapping with the PUSCH for carrying the PHR MAC-CE.

C: Multiple transmission occasions for the scheduled PUSCH corresponding to a slot overlapping with the PUSCH for carrying the PHR MAC-CE.

D: A transmission occasion corresponding to an earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE.

E: Multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE.

F: One or more predefined transmission occasions before a slot of the PUSCH for carrying the PHR MAC-CE.

(2) When the subcarrier spacing corresponding to the active BWP of the carrier for reporting the PHR MAC-CE is equal to the subcarrier spacing corresponding to the active BWP of the carrier where the PUSCH is transmitted, the designated transmission occasion may be one of the following transmission occasions in A to E.

A: A first transmission occasion for PUSCH transmissions.

B: An earliest transmission occasion among transmission occasions overlapping with a slot for reporting the PHR MAC-CE.

C: A transmission occasion corresponding to an earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE.

D: Multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE.

E: One or more predefined transmission occasions before a slot for reporting the PHR MAC-CE.

According to embodiments of the disclosure, when the terminal actually schedules the single TRP to transmit the PUSCH, it may measure the actual PH on the designated transmission occasion, and report the PHR including the single PH, that is, report one PHR value, corresponding to the actually scheduled single TRP.

According to embodiments of the disclosure, when the terminal actually schedules multiple TRPs to transmit the PUSCHs, it may measure multiple PHs of multiple TRPs on designated transmission occasions, and report the PHR including a single PH or multiple PHs.

Figure 10:
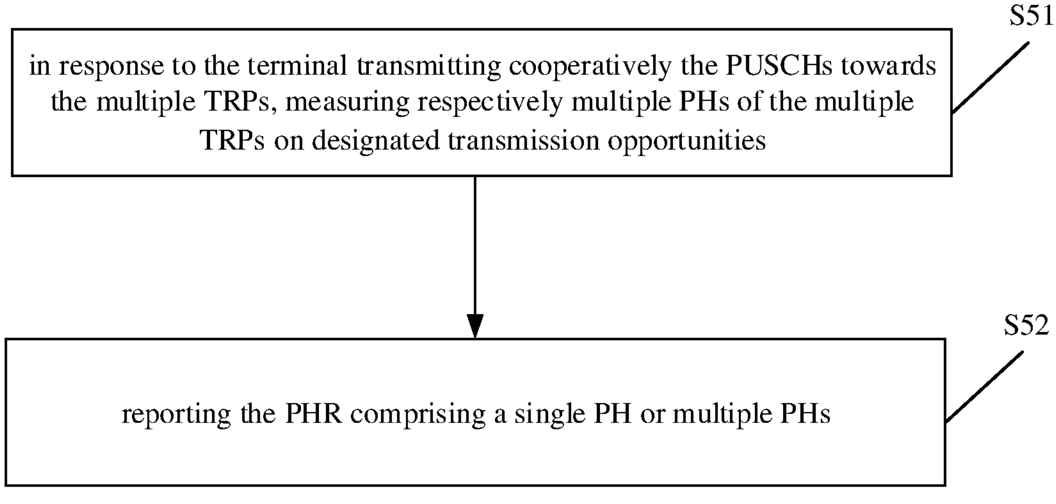
FIG. 10 is a flowchart illustrating a method for reporting a PHR according to some embodiments.

FIG. 10 is a flowchart illustrating a method for reporting a PHR according to some embodiments. The method for reporting the PHR may be performed alone or in combination with other embodiments of the disclosure. As illustrated in FIG. 10, the method for reporting the PHR is applied in the terminal and includes the following steps.

In step S51, in response to the terminal transmitting cooperatively the PUSCHs towards the multiple TRPs, multiple PHs of the multiple TRPs on designated transmission occasions are respectively measured.

In step S52, the PHR including a single PH or multiple PHs is reported.

According to embodiments of the disclosure, the actual PH measurement or virtual PH measurement may be performed when measuring multiple PHs of multiple TRPs on designated transmission occasions.

According to embodiments of the disclosure, when measuring multiple PHs of multiple TRPs on designated transmission occasions, different measurement manners may be used according to whether a PUSCH for carrying a PHR MAC-CE and an actually scheduled PUSCH are located on a same carrier.

(1) When a PUSCH for carrying a PHR MAC-CE and an actually scheduled PUSCH are located on a same carrier, any one of the following manners 1 to 6 may be used to measure multiple PHs of multiple TRPs on designated transmission occasions.

Manner 1: Measuring respectively multiple actual PHs after transmitting respectively the PUSCHs on respective first transmission occasions corresponding to the multiple TRPs.

Manner 2: In a slot overlapping with the PUSCH for carrying the PHR MAC-CE, measuring on respective earliest transmission occasions to be transmitted in transmission occasion groups corresponding to the TRPs for scheduling the PUSCHs, to obtain multiple actual PHs.

Manner 3: In a slot overlapping with multiple slot transmissions corresponding to a nominal transmission occasion of a PUSCH repetition type B for carrying the PHR MAC-CE, measuring on respective earliest transmission occasions to be transmitted in transmission occasion groups corresponding to the TRPs, to obtain multiple actual PHs.

Manner 4: In a slot overlapping with multiple slot transmissions corresponding to a nominal transmission occasion of a PUSCH repetition type B for carrying the PHR MAC-CE, measuring on multiple transmission occasions in respective transmission occasion groups corresponding to the TRPs, to obtain multiple actual PHs.

Manner 5: Measuring respectively after transmitting respectively the PUSCHs on respective predefined transmission occasions corresponding to the TRPs before a slot for reporting the PHR MAC-CE on the multiple TRPs to obtain multiple actual PHs.

Manner 6: Measuring respectively after transmitting respectively the PUSCHs on respective predefined transmission occasions corresponding to the TRPs after a slot for reporting the PHR MAC-CE on the multiple TRPs to obtain multiple virtual PHs.

(2) When a PUSCH for carrying a PHR MAC-CE and an actually scheduled PUSCH are located on different carriers, any one of the following manners 1 to 4 may be used to measure multiple PHs of multiple TRPs on designated transmission occasions.

For the convenience of descriptions, different TRPs among the multiple TRPs are referred to as a first TRP and a second TRP. The first TRP is one of the TRPs, and the second TRP is one or more TRPs different from the first TRP in the multiple TRPs.

Manner 1: Measuring an actual PH after the PUSCH is transmitted on a transmission occasion for a first TRP in and/or before a slot where the PUSCH is transmitted, and measuring an actual PH after the PUSCH is transmitted in a predefined slot for a second TRP in and/or before a slot where the PUSCH is transmitted.

Manner 2: Measuring an actual PH after the PUSCH is transmitted on a transmission occasion for a first TRP in and/or before a slot where the PUSCH is transmitted, measuring an actual PH after the PUSCH is transmitted in a predefined slot for a second TRP in and/or before a slot where the PUSCH is transmitted, and using the PH measured for the second TRP before the slot the PUSCH is transmitted as an actual PH after transmitting the PUSCH in a predefined slot after the slot where the PUSCH is transmitted.

Manner 3: Measuring an actual PH after the PUSCH is transmitted on a transmission occasion for a first TRP in and/or before a slot where the PUSCH is transmitted, and measuring a virtual PH for a second TRP in a predefined slot after a slot where the PUSCH is transmitted; or measuring an actual PH after the PUSCH is transmitted in a slot for a second TRP where the PUSCH is transmitted, and measuring a virtual PH for a first TRP in a predefined slot after a slot where the PUSCH is transmitted.

Manner 4: Measuring respectively the multiple PHs after the PUSCHs are transmitted respectively on the respective transmission occasions for the multiple TRPs according to a subcarrier spacing corresponding to an active BWP of a carrier for reporting the PHR MAC-CE and a subcarrier spacing corresponding to an active BWP of a carrier where the transmitted PUSCH is located.

Further, according to embodiments of the disclosure, when measuring respectively the multiple PHs after the PUSCHs are transmitted respectively on the respective transmission occasions for the multiple TRPs according to the subcarrier spacing corresponding to the active BWP of the carrier for reporting the PHR MAC-CE and the subcarrier spacing corresponding to the active BWP of the carrier where the transmitted PUSCH is located, different PH measurement manners may be determined according to a size between the subcarrier spacing corresponding to the active BWP of the carrier for reporting the PHR MAC-CE and the subcarrier spacing corresponding to the active BWP of the carrier where the transmitted PUSCH is located.

According to embodiments, when the subcarrier spacing corresponding to the active BWP of the carrier for reporting the PHR MAC-CE is smaller than the subcarrier spacing corresponding to the active BWP of the carrier where the PUSCH is transmitted, actual PHs when the PUSCHs are transmitted respectively for the first TRP and the second TRP are on respective first transmission occasions among multiple coincident transmission occasions between different carriers are measured respectively, or actual PHs when the PUSCHs are transmitted respectively for the first TRP and the second TRP on multiple coincident transmission occasions between different carriers are measured respectively.

According to embodiments, when the subcarrier spacing corresponding to the active BWP of the carrier for reporting the PHR MAC-CE is equal to the subcarrier spacing corresponding to the active BWP of the carrier where the PUSCH is transmitted, multiple actual PHs when the PUSCHs are transmitted respectively on the respective transmission occasions for the multiple TRPs the PUSCHs are transmitted respectively for the multiple TRPs on respective first transmission occasions are measured respectively.

Based on the above manners according to embodiments of the disclosure, after the PH measurement is performed, the PHR including a single PH or multiple PHs may be reported.

According to embodiments of the disclosure, in the case of reporting the PHR including the single PH, the single PH is one of the following PHs:

A: A measured PH corresponding a first TRP by default or by predefined. For example: a PHR corresponding to a power control parameter corresponding to a set with a smaller SRS resource set ID.

B: A measured PH corresponding to a TRP using a first transmission occasion by default or by predefined.

C: A measured PH according to a TRP selected by the terminal where a PHR is lower than a PHR threshold. Through self-selection by the terminal, the relatively "poor" TRP calculation result of the PHR may be selected and reported to the network.

D: A PH corresponding to a TRP determined according to positive and negative values, and absolute values of PHs measured for the multiple TRPs.

When two PHR power values are the actual PHR/virtual PHR, or when one PHR power value is the actual PHR and another PHR power value is the virtual PHR, the manner D may be used to determine the single PH.

There is a single negative value in PH measured values obtained when multiple TRP measurements are performed, and the single negative value is taken as the TRP of the single PH in the PHR. When the PH measured values obtained when multiple TRP measurements are performed are all negative values, the TRP with the largest absolute value of the PH measured value is used as the TRP of the single PH in the PHR. When the PH measured values obtained when multiple TRP measurements are performed are all positive values, the TRP with the smallest absolute value of the PH measured value is used as the TRP of the single PH in the PHR.

E: An actual PH measured corresponding to a TRP actually transmitting the PUSCH when there are actual PHR and virtual PHR in the multiple TRPs at the same time. For example, when a PHR power value is an actual PHR and another PHR power value is a virtual PHR, the PHR corresponding to the actual PHR is reported first, and the SRS resource set ID or other signs used to distinguish TRPs are selected to be reported.

F: A PH measured according to a TRP configured or indicated by a network. That is, the terminal reports the PH according to the signaling instruction from the network side.

According to embodiments of the disclosure, when the terminal actually schedules the multiple TRPs to transmit the PUSCHs, it may separately measure the multiple PHs of the multiple TRPs on the respective designated transmission occasions, and report the PHR including the single PH or the multiple PHs. Through the enhancement of the PHR measurement and reporting, the PHR measurement and reporting for the multi-TRP-based PUSCH for different transmission manners may be realized, to better support the dynamic scheduling for different transmission manners, realize the precise power control, and realize the more effective allocation and utilization for network resources.

According to embodiments of the disclosure, the network device may configure the manner in which the terminal measures the PH and reports the PHR. The terminal measures the PH and reports the PHR according to the configuration mode of the network device. The network device obtains the PHR on the one or more cooperative TRPs reported by the terminal, and performs the power control, so as to better allocate and utilize network resources.

According to the same idea, a method for reporting a PHR, applied to the network device is provided according to embodiments of the disclosure.

Figure 11:
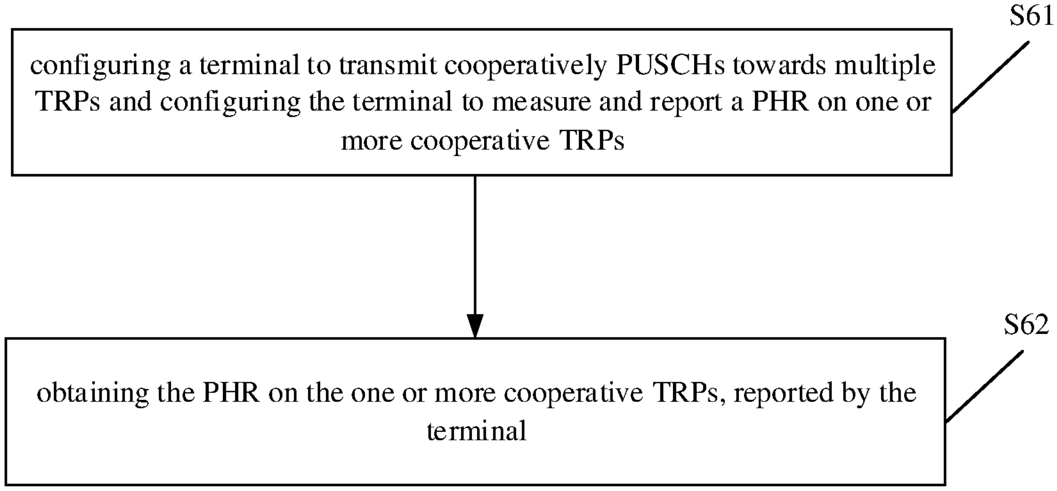
FIG. 11 is a flowchart illustrating a method for reporting a PHR according to some embodiments.

FIG. 11 is a flowchart illustrating a method for reporting a PHR according to some embodiments. The method for reporting the PHR may be performed independently or together with other embodiments of the disclosure. As illustrated in FIG. 11, the method for reporting the PHR is applied in the terminal and includes the following steps.

In step S61, the terminal is configured to transmit cooperatively PUSCHs towards multiple TRPs, and the terminal is configured to measure and report a PHR on one or more cooperative TRPs.

In step S62, the PHR on the one or more cooperative TRPs reported by the terminal is obtained.

According to embodiments of the disclosure, the network device configures the terminal to measure and report the PHR on the one or more cooperative TRPs, and obtains the PHR on the one or more cooperative TRPs reported by the terminal. the PHR measurement and reporting for the multi-TRP-based PUSCH for different transmission manners may be realized, to better support the dynamic scheduling for different transmission manners, realize the precise power control, and realize the more effective allocation and utilization for network resources.

The implementation manner in which the network device configures the terminal to measure and report the PHR on the one or more cooperative TRPs according to embodiments of the disclosure is the same as the implementation manner in which the terminal specifically measure and reports the PHR on the one or more cooperative TRPs according to the above embodiments, Correspondingly, for a specific configuration process, reference may be made to relevant descriptions according to the above embodiments, and details are not repeated herein.

It should be understood that, the method for reporting the PHR according to embodiments of the disclosure may also be applied to the interacting implementation process between the terminal and the network device to realize the PHR reporting. In the process of implementing the PHR reporting through the interaction between the network device and the terminal, the network device and the terminal respectively have the relevant functions involved according to the above embodiments, so details will not be described herein.

Applying the method for reporting the PHR according to the above embodiments, the embodiments of the disclosure may include the following enhancement solutions for performing the PH measurement and PHR reporting.

(One) When the PUSCH is not actually transmitted, the virtual PHR measurement is configured.

Alt.1: Calculating according to the default or predefined sTRP reference assumption, and measuring and reporting using the virtual PHR.

Alt.2: Calculating according to the default or predefined mTRP reference assumption, and measuring and reporting using the virtual PHR.

The PUSCH reference format may be determined according to the PUSCH transmission mode of mTRP based on a predefined or default cooperative transmission mode such as TDM/SDM/FDM.

(Two) When the sTRP is actually used and the PUSCH is transmitted, the actual PHR measurement is configured.

(1) When the PHR MAC-CE and the PUSCH include the uplink (UL) carrier aggregation (CA) on the same CC but are located on the same carrier, the following manners may be used.

Alt.1: Using the actual PHR to measure the first transmission occasion and reporting one PHR value.

Alt.2: Using the actual PHR to measure the pre-defined (such as the latest) transmission occasion before the slot for reporting the PHR MAC-CE, and reporting one PHR value.

Alt.3: Using multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE, and reporting one PHR value, or using one or more predefined transmission occasions before the slot for reporting the PHR MAC-CE, and reporting one PHR value.

(2) When the UL CA is considered but not on the same carrier, using the transmission occasion in the same slot of the PHR MAC-CE and the actual PHR measurement, and reporting one PHR value.

When the subcarrier spacing corresponding to the active BWP of the carrier where the PHR MAC-CE is located is smaller than the subcarrier spacing corresponding to the active BWP of the carrier where the PUSCH is located, the following manners may be used.

Alt.1: Calculating on the first transmission occasion of the PUSCH and reporting one PHR.

Alt.2: Calculating on the first transmission occasion among multiple overlapping transmission occasions and reporting one PHR.

Alt.3: Calculating on multiple overlapping transmission occasions and reporting one PHR.

Alt.4: Measuring on the predefined (such as the latest) transmission occasion before the slot for reporting the PHR MAC-CE report, and reporting one PHR.

Alt.5: Measuring on the transmission occasion corresponding to the earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE, and reporting one PHR.

Alt.6: Measuring on multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE, and reporting one PHR.

When the subcarrier spacing corresponding to the active BWP of the carrier where the PHR MAC-CE is located is equal to the subcarrier spacing corresponding to the active BWP of the carrier where the PUSCH is located, the following manners may be used.

Alt.1: Calculating on the first transmission occasion of the PUSCH and reporting one PHR.

Alt.2: Calculating on the first overlapping transmission occasion and reporting one PHR.

Alt.3: Measuring the predefined (for example, the latest) transmission occasion before the slot for reporting the PHR MAC-CE, and reporting one PHR.

Alt.4: Measuring on the transmission occasion corresponding to the earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE, and reporting one PHR.

Alt.5: Measuring on multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE, and reporting one PHR.

(Three) When the mTRP is actually used and the PUSCH is transmitted, different measurement types are configured.

(1) When PHR MAC-CE and PUSCH are in the same CC, including CA in the same CC, the following manner may be used.

Alt.1: Using the actual PHRs to measure respectively the respective first transmission occasions corresponding to different TRPs, and reporting one or more PHR values.

Alt.2: Using the actual PHRs to measure respectively the respective predefined (such as the latest) transmission occasions of different TRPs before the slot for reporting the PHR MAC-CE, and reporting one or more PHR values.

Alt.3: In a slot overlapping with the PUSCH repetition type B transmission for carrying the PHR MAC-CE, using the actual PHRs to measure respectively on the respective earliest transmission occasions in the transmission occasion groups corresponding to the respective TRPs, and reporting one or more PHR values.

Alt.4: In a slot overlapping with the PUSCH repetition type B transmission for carrying the PHR MAC-CE, using the actual PHRs to measure respectively on multiple transmission occasions in respective transmission occasion groups corresponding to the respective TRPs, and reporting one or more PHR values.

(2) When UL CA is considered but not located on the same carrier, and when the PHR MAC-CE is transmitted on slot #n of CC #1, and the PUSCH is transmitted on CC #2, the following manners are used.

Alt.1: Configuring as the actual PHR. When the PUSCH is corresponding to the transmission occasion of TRP1 (TRP2 is the same) on slot #n, the measurement corresponding to the TRP is calculated and reported using the actual PHR. For the transmission occasion of TRP2, the actual PHR is used to calculate the PHR on the pre-defined transmission occasion before slot #n.

Alt.2: Configuring as the actual PHR. when the PUSCH is corresponding to the transmission occasion of TRP1 on slot #n, the actual PHR is used to calculate and report. For the transmission occasion of TRP2, the actual PHR is used to calculate the PHR through the predefined transmission occasion before the slot #n, and it is considered that the PHR in one transmission is little change, so it is equivalent to transmitting and reporting the transmission occasion after slot #n.

Alt.3: Configuring as the actual+virtual PHR. When the PUSCH is corresponding to the transmission occasion of TRP1 on the slot #n, the actual PHR is used to calculate and report. For the transmission occasion of TRP2, the virtual PHR is used to calculate the PHR through the predefined transmission occasion after the slot #n.

(3) The Relation Processing of the Subcarrier Spacing

When the subcarrier spacing of the active BWP of the carrier where the PHR MAC-CE is located is smaller than the subcarrier spacing of the active BWP of the carrier where the PUSCH is located, it calculates and measures on the first transmission occasion of multiple PUSCH transmission occasions overlapping with the slot where the PHR MAC-CE is located to obtain the PHR. The transmission occasion corresponding to another TRP is the same. Or it calculates and measures on multiple PUSCH transmission occasions overlapping with the slot where the PHR MAC-CE is located to obtain the PHR. The transmission occasions corresponding to another TRP are the same.

When the subcarrier spacing of the active BWP of the carrier where the PHR MAC-CE is located is equal to the subcarrier spacing of the active BWP of the carrier where the PUSCH is located, the first transmission occasion is calculated and the PHR is measured.

Further, when the PHR measurement values corresponding to different TRPs are obtained, one of the PHR values is selected for reporting, and the following rules may be used.

Alt.1: By default, the PHR corresponding to the first TRP is used, for example the PHR corresponding to the power control parameter corresponding to the set with the smaller SRS resource set ID.

Alt.2: By default, or by predefined, the PHR calculated for the TRP corresponding to the first transmission occasion is used.

Alt.3: Through the UE's own choice, the TRP calculation result of relatively "poor" PHR may be selected and reported to the network. When two PHR power values are the actual PHR/virtual PHR, or when one PHR power value is the actual PHR and another PHR power value is the virtual PHR, PHR1 and PHR2 respectively, the following manners may be used.

Manner 1: when there is a negative value in the calculated values, the corresponding PHR calculation result should be reported first.

Manner 2: when they are all negative values, the PHR calculation result with the larger absolute value should be reported first.

Manner 3: when they are all positive values, the PHR calculation result with the small absolute value should be reported first.

It may be considered to report the corresponding SRI ranking or SRS resource set ID or other signs used to distinguish the TRPs while reporting the results of the above PHRs.

Alt.4: When a PHR power value is the actual PHR and another PHR power value is the virtual PHR, the PHR corresponding to the actual PHR is reported first, and it may choose to report the SRS resource set ID or other signs used to distinguish the TRPs.

Alt.5: It reports according to the signaling instruction from the network side.

According to embodiments of the disclosure, through the enhancement of the PHR measurement reporting, the PHR measurement and reporting for the multi-TRP-based PUSCH for different transmission manners may be realized, to better support the dynamic scheduling for different transmission manners, realize the precise power control, and realize the more effective allocation and utilization for network resources.

It should be noted that those skilled in the art may understand that the various implementations/embodiments mentioned above according to the embodiments of the disclosure may be used in conjunction with the above embodiments or may be used independently. Whether it is used alone or in conjunction with the above embodiments, its implementation principle may be similar. During the implementation of the disclosure, some embodiments are described in the manner of being used together. Of course, those skilled in the art may understand that such an illustration is not a limitation to the embodiments of the disclosure.

Based on the same idea, an apparatus for reporting a PHR is provided according to embodiments of the disclosure.

It should be understood that, in order to realize the above functions, the apparatus for reporting the PHR provided according to the embodiments of the disclosure includes corresponding hardware structures and/or software modules for performing various functions. Combining the units and algorithm steps of each example disclosed according the embodiments of the disclosure, the embodiments of the disclosure may be implemented in the form of hardware or a combination of hardware and computer software. Whether a certain function is executed by hardware or computer software driving hardware depends on the specific application and design constraints of the technical solutions. Those skilled in the art may use different manners to implement the described functions for each specific application, but such implementation should not be regarded as exceeding the scope of the technical solutions according to the embodiments of the disclosure.

Figure 12:
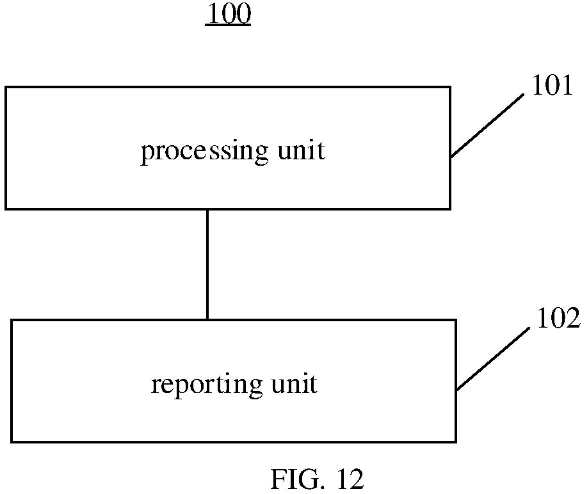
FIG. 12 is a block diagram of an apparatus for reporting a PHR according to some embodiments.

FIG. 12 is a block diagram of an apparatus for reporting a PHR according to some embodiments. Referring to FIG. 12, the apparatus 100 for reporting the PHR is applied to a terminal and includes a processing unit 101 and a reporting unit 102.

The processing unit 101 is configured to determine the terminal transmitting cooperatively PUSCHs towards multiple TRPs.

The reporting unit 102 is configured to measure and report a PHR on one or more cooperative TRPs.

According to embodiments, in response to that the terminal does not transmit the PUSCH actually, the reporting unit 102 is configured to measure a virtual PH of the PUSCH according to a default or predefined reference format corresponding to a single TRP or multiple TRPs as a calculation assumption, and report the PHR including the virtual PH corresponding to the PUSCH.

According to embodiments, the reporting unit 102 is configured to determine a PUSCH reference format according to a reference cooperative transmission mode corresponding to transmitting cooperatively the PUSCHs towards the multiple TRPs; and report the PHR including the virtual PH corresponding to the PUSCH according to the PUSCH reference format.

According to embodiments, in response to that the terminal schedules actually a single TRP to transmit the PUSCH, the reporting unit 102 is configured to measure an actual PH when the PUSCH is transmitted on a designated transmission occasion, and report the PHR including the actual PH.

According to embodiments, in response to that a PUSCH for carrying a PHR MAC-CE and the actually scheduled PUSCH are located on a same carrier, the designated transmission occasion including:

- a first transmission occasion for PUSCH transmissions,
- a corresponding earliest transmission occasion for transmitting the scheduled PUSCH in a slot overlapping with the PUSCH for carrying the PHR MAC-CE,
- a transmission occasion corresponding to an earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE,
- multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE, or
- one or more predefined transmission occasions before a slot for reporting the PHR MAC-CE.

According to embodiments, in response to that the PUSCH for carrying the PHR MAC-CE and the actually scheduled PUSCH are located on different carriers, the designated transmission occasion is determined according to a subcarrier spacing corresponding to an active BWP of a carrier for reporting the PHR MAC-CE and a subcarrier spacing corresponding to an active BWP of a carrier where the PUSCH is transmitted.

According to embodiments, in response to the subcarrier spacing corresponding to the active BWP of the carrier for reporting the PHR MAC-CE being smaller than the subcarrier spacing corresponding to the active BWP of the carrier where the PUSCH is transmitted, the designated transmission occasion includes:

- a first transmission occasion for PUSCH transmissions;
- an earliest transmission occasion to be transmitted among transmission occasions for the scheduled PUSCH in a slot overlapping with the PUSCH for carrying the PHR MAC-CE;
- multiple transmission occasions for the scheduled PUSCH corresponding to a slot overlapping with the PUSCH for carrying the PHR MAC-CE;
- a transmission occasion corresponding to an earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE;

multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE; or one or more predefined transmission occasions before a slot of the PUSCH for carrying the PHR MAC-CE.

According to embodiments, in response to the subcarrier spacing corresponding to the active BWP of the carrier for reporting the PHR MAC-CE being equal to the subcarrier spacing corresponding to the active BWP of the carrier where the PUSCH is transmitted, the designated transmission occasion includes:

a first transmission occasion for PUSCH transmissions;

an earliest transmission occasion among transmission occasions overlapping with a slot for reporting the PHR MAC-CE;

a transmission occasion corresponding to an earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE;

multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE; or one or more predefined transmission occasions before a slot for reporting the PHR MAC-CE.

According to embodiments, the reporting unit 102 is configured to report the PHR including a single actual PH.

According to embodiments, in response to the terminal transmitting cooperatively the PUSCHs towards the multiple TRPs, the reporting unit 102 is configured to measure respectively multiple PHs of the multiple TRPs on designated transmission occasions, and report the PHR including a single PH or multiple PHs.

According to embodiments, in response to that a PUSCH for carrying a PHR MAC-CE and an actually scheduled PUSCH are located on a same carrier, the reporting unit 102 is configured to measure respectively the multiple PHs of the multiple TRPs on the designated transmission occasions by:

measuring respectively multiple actual PHs after transmitting respectively the PUSCHs on respective first transmission occasions corresponding to the multiple TRPs;

in a slot overlapping with the PUSCH for carrying the PHR MAC-CE, measuring on respective earliest transmission occasions to be transmitted in transmission occasion groups corresponding to the TRPs for scheduling the PUSCHs, to obtain multiple actual PHs;

in a slot overlapping with multiple slot transmissions corresponding to a nominal transmission occasion of a PUSCH repetition type B for carrying the PHR MAC-CE, measuring on respective earliest transmission occasions to be transmitted in transmission occasion groups corresponding to the TRPs, to obtain multiple actual PHs;

in a slot overlapping with multiple slot transmissions corresponding to a nominal transmission occasion of a PUSCH repetition type B for carrying the PHR MAC-CE, measuring on multiple transmission occasions in respective transmission occasion groups corresponding to the TRPs, to obtain multiple actual PHs;

measuring respectively after transmitting respectively the PUSCHs on respective predefined transmission occasions corresponding to the TRPs before a slot for reporting the PHR MAC-CE on the multiple TRPs to obtain multiple actual PHs; or measuring respectively after transmitting respectively the PUSCHs on respective predefined transmission occasions corresponding to the TRPs after a slot for reporting the PHR MAC-CE on the multiple TRPs to obtain multiple virtual PHs.

According to embodiments, the reporting unit 102 is configured to measure respectively the multiple PHs of the multiple TRPs on the designated transmission occasions by:

in response to that a PUSCH for carrying a PHR MAC-CE and an actually scheduled PUSCH are located on different carriers, measuring an actual PH after the PUSCH is transmitted on a transmission occasion for a first TRP in and/or before a slot where the PUSCH is transmitted, and measuring an actual PH after the PUSCH is transmitted in a predefined slot for a second TRP in and/or before a slot where the PUSCH is transmitted;

in response to that a PUSCH for carrying a PHR MAC-CE and an actually scheduled PUSCH are located on different carriers, measuring an actual PH after the PUSCH is transmitted on a transmission occasion for a first TRP in and/or before a slot where the PUSCH is transmitted, measuring an actual PH after the PUSCH is transmitted in a predefined slot for a second TRP in and/or before a slot where the PUSCH is transmitted, and using the PH measured for the second TRP before the slot the PUSCH is transmitted as an actual PH after transmitting the PUSCH in a predefined slot after the slot where the PUSCH is transmitted;

in response to that a PUSCH for carrying a PHR MAC-CE and an actually scheduled PUSCH are located on different carriers, measuring an actual PH after the PUSCH is transmitted on a transmission occasion for a first TRP in and/or before a slot where the PUSCH is transmitted, and measuring a virtual PH for a second TRP in a predefined slot after a slot where the PUSCH is transmitted; or measuring an actual PH after the PUSCH is transmitted in a slot for a second TRP where the PUSCH is transmitted, and measuring a virtual PH for a first TRP in a predefined slot after a slot where the PUSCH is transmitted; or in response to that a PUSCH for carrying a PHR MAC-CE and an actually scheduled PUSCH are located on different carriers, measuring respectively the multiple PHs after the PUSCHs are transmitted respectively on the respective transmission occasions for the multiple TRPs according to a subcarrier spacing corresponding to an active BWP of a carrier for reporting the PHR MAC-CE and a subcarrier spacing corresponding to an active BWP of a carrier where the transmitted PUSCH is located.

The second TRP is one or more other TRPs in the multiple TRPs that are different from the first TRP.

According to embodiments, in response to the subcarrier spacing corresponding to the active BWP of the carrier for reporting the PHR MAC-CE being smaller than the subcarrier spacing corresponding to the active BWP of the carrier where the PUSCH is transmitted, the reporting unit 102 is configured to: measure respectively actual PHs when the PUSCHs are transmitted respectively for the first TRP and the second TRP on respective first transmission occasions among multiple coincident transmission occasions between different carriers, or measure respectively actual PHs when the PUSCHs are transmitted respectively for the first TRP and the second TRP on multiple coincident transmission occasions between different carriers; or in response to the subcarrier spacing corresponding to the active BWP of the carrier for reporting the PHR MAC-CE being equal to the subcarrier spacing corresponding to the active BWP of the carrier where the PUSCH is transmitted, the reporting unit 102 is configured to: measure respectively multiple actual PHs when the PUSCHs are transmitted respectively for the multiple TRPs on respective first transmission occasions.

According to embodiments, the single PH in the PHR is one of:

- a measured PH corresponding a first TRP by default or by predefined;
- a measured PH corresponding to a TRP using a first transmission occasion by default or by predefined;
- a measured PH according to a TRP selected by the terminal where a PHR is lower than a PHR threshold;
- a PH corresponding to a TRP determined according to positive and negative values, and absolute values of PHs measured for the multiple TRPs;
- an actual PH measured corresponding to a TRP actually transmitting the PUSCH when there are actual PHR and virtual PHR in the multiple TRPs at the same time; or
- a PH measured according to a TRP configured or indicated by a network.

According to embodiments, in response to the PHs measured for the multiple TRPs includes a single negative value, the reporting unit 102 is configured to use a TRP corresponding to the single negative value as the TRP of the single PH in the PHR; in response to the PHs measured for the multiple TRPs being all negative values, the reporting unit is configured to use a TRP with a largest PH absolute value as the TRP of the single pH in the PHR; or in response to the PHs measured for the multiple TRPs being all positive values, the reporting unit is configured to use a TRP with a smallest PH absolute value as the TRP of the single pH in the PHR.

Figure 13:
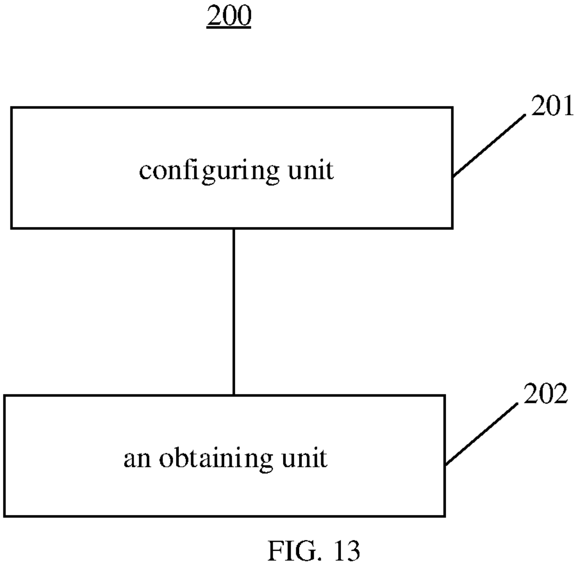
FIG. 13 is a block diagram of an apparatus for reporting a PHR according to some embodiments.

FIG. 13 is a block diagram of an apparatus for reporting a PHR according to some embodiments. Referring to FIG. 13, the apparatus 200 for reporting the PHR is applied to the network device and includes a configuring unit 201 and an obtaining unit 202.

The configuring unit 201 is configured to configure a terminal to transmit cooperatively PUSCHs towards multiple TRPs, and configure the terminal to measure and report a PHR on one or more cooperative TRPs.

The obtaining unit 202 is configured to obtain the PHR on the one or more cooperative TRPs, reported by the terminal.

According to embodiments, in response to that the terminal does not transmit the PUSCH actually, the configuring unit 201 is configured to configure the terminal to measure a virtual PH of the PUSCH according to a default or predefined reference format corresponding to a single TRP or multiple TRPs as a calculation assumption, and configure the terminal to report the PHR including the virtual PH corresponding to the PUSCH.

According to embodiments, the configuring unit 201 is configured to configure the terminal to determine a PUSCH reference format according to a reference cooperative transmission mode corresponding to transmitting cooperatively the PUSCHs towards the multiple TRPs; and configure the terminal to report the PHR including the virtual PH corresponding to the PUSCH according to the PUSCH reference format.

According to embodiments, in response to that the terminal schedules actually a single TRP to transmit the PUSCH, the configuring unit 201 is configured to configure the terminal to measure an actual PH when the PUSCH is transmitted on a designated transmission occasion, and to report the PHR including the actual PH.

According to embodiments, in response to that a PUSCH for carrying a PHR MAC-CE and the actually scheduled PUSCH are located on a same carrier, the designated transmission occasion includes:

- a first transmission occasion for PUSCH transmissions,
- a corresponding earliest transmission occasion for transmitting the scheduled PUSCH in a slot overlapping with the PUSCH for carrying the PHR MAC-CE,
- a transmission occasion corresponding to an earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE,
- multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE, or
- one or more predefined transmission occasions before a slot for reporting the PHR MAC-CE.

According to embodiments, in response to that the PUSCH for carrying the PHR MAC-CE and the actually scheduled PUSCH are located on different carriers, the designated transmission occasion is determined according to a subcarrier spacing corresponding to an active BWP of a carrier for reporting the PHR MAC-CE and a subcarrier spacing corresponding to an active BWP of a carrier where the PUSCH is transmitted.

According to embodiments, in response to the subcarrier spacing corresponding to the active BWP of the carrier for reporting the PHR MAC-CE being smaller than the subcarrier spacing corresponding to the active BWP of the carrier where the PUSCH is transmitted, the designated transmission occasion includes:

- a first transmission occasion for PUSCH transmissions;
- an earliest transmission occasion to be transmitted among transmission occasions for the scheduled PUSCH in a slot overlapping with the PUSCH for carrying the PHR MAC-CE;
- multiple transmission occasions for the scheduled PUSCH corresponding to a slot overlapping with the PUSCH for carrying the PHR MAC-CE;
- a transmission occasion corresponding to an earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE;
- multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE; or one or more predefined transmission occasions before a slot of the PUSCH for carrying the PHR MAC-CE.

According to embodiments, in response to the subcarrier spacing corresponding to the active BWP of the carrier for reporting the PHR MAC-CE being equal to the subcarrier spacing corresponding to the active BWP of the carrier where the PUSCH is transmitted, the designated transmission occasion includes:

a first transmission occasion for PUSCH transmissions;

an earliest transmission occasion among transmission occasions overlapping with a slot for reporting the PHR MAC-CE;

a transmission occasion corresponding to an earliest slot to be transmitted in one or more slots for the scheduled PUSCH where the one or more slots overlaps with multiple slot transmissions corresponding to a nominal transmission occasion of a PUSCH repetition type B for carrying the PHR MAC-CE;

multiple transmission occasions corresponding to multiple slots for the scheduled PUSCH where the multiple slots overlaps with multiple slot transmissions corresponding to a nominal transmission occasion of a PUSCH repetition type B for carrying the PHR MAC-CE; or one or more predefined transmission occasions before a slot for reporting the PHR MAC-CE.

According to embodiments, the obtaining unit 202 is configured to obtain the PHR including a single actual PH.

According to embodiments, in response to the terminal transmitting cooperatively the PUSCHs towards the multiple TRPs, the configuring unit 201 is configured to configure the terminal to measure respectively multiple PHs of the multiple TRPs on designated transmission occasions, and to report the PHR including a single PH or multiple PHs.

According to embodiments, in response to that a PUSCH for carrying a PHR MAC-CE and an actually scheduled PUSCH are located on a same carrier, the configuring unit 201 is configured to configure the terminal to measure respectively the multiple PHs of the multiple TRPs on the designated transmission occasions by:

configuring the terminal to measure respectively multiple actual PHs after transmitting respectively the PUSCHs on respective first transmission occasions corresponding to the multiple TRPs;

in a slot overlapping with the PUSCH for carrying the PHR MAC-CE, configuring the terminal to measure on respective earliest transmission occasions to be transmitted in transmission occasion groups corresponding to the TRPs for scheduling the PUSCHs, to obtain multiple actual PHs;

in a slot overlapping with multiple slot transmissions corresponding to a nominal transmission occasion of a PUSCH repetition type B for carrying the PHR MAC-CE, configuring the terminal to measure on respective earliest transmission occasions to be transmitted in transmission occasion groups corresponding to the TRPs, to obtain multiple actual PHs;

in a slot overlapping with multiple slot transmissions corresponding to a nominal transmission occasion of a PUSCH repetition type B for carrying the PHR MAC-CE, configuring the terminal to measure on multiple transmission occasions in respective transmission occasion groups corresponding to the TRPs, to obtain multiple actual PHs;

configuring the terminal to measure respectively after transmitting respectively the PUSCHs on respective predefined transmission occasions corresponding to the TRPs before a slot for reporting the PHR MAC-CE on the multiple TRPs to obtain multiple actual PHs; or configuring the terminal to measure respectively after transmitting respectively the PUSCHs on respective predefined transmission occasions corresponding to the TRPs after a slot for reporting the PHR MAC-CE on the multiple TRPs to obtain multiple virtual PHs.

According to embodiments, the configuring unit 201 is configured to configure the terminal to measure respectively the multiple PHs of the multiple TRPs on the designated transmission occasions by:

in response to that a PUSCH for carrying a PHR MAC-CE and an actually scheduled PUSCH are located on different carriers, configuring the terminal to measure an actual PH after the PUSCH is transmitted on a transmission occasion for a first TRP in and/or before a slot where the PUSCH is transmitted, and measure an actual PH after the PUSCH is transmitted in a predefined slot for a second TRP in and/or before a slot where the PUSCH is transmitted;

in response to that a PUSCH for carrying a PHR MAC-CE and an actually scheduled PUSCH are located on different carriers, configuring the terminal to measure an actual PH after the PUSCH is transmitted on a transmission occasion for a first TRP in and/or before a slot where the PUSCH is transmitted, measure an actual PH after the PUSCH is transmitted in a predefined slot for a second TRP in and/or before a slot where the PUSCH is transmitted, and use the PH measured for the second TRP before the slot the PUSCH is transmitted as an actual PH after transmitting the PUSCH in a predefined slot after the slot where the PUSCH is transmitted;

in response to that a PUSCH for carrying a PHR MAC-CE and an actually scheduled PUSCH are located on different carriers, configuring the terminal to measure an actual PH after the PUSCH is transmitted on a transmission occasion for a first TRP in and/or before a slot where the PUSCH is transmitted, and measure a virtual PH for a second TRP in a predefined slot after a slot where the PUSCH is transmitted; or measure an actual PH after the PUSCH is transmitted in a slot for a second TRP where the PUSCH is transmitted, and measure a virtual PH for a first TRP in a predefined slot after a slot where the PUSCH is transmitted; or in response to that a PUSCH for carrying a PHR MAC-CE and an actually scheduled PUSCH are located on different carriers, configuring the terminal to measure respectively the multiple PHs after the PUSCHs are transmitted respectively on the respective transmission occasions for the multiple TRPs according to a subcarrier spacing corresponding to an active BWP of a carrier for reporting the PHR MAC-CE and a subcarrier spacing corresponding to an active BWP of a carrier where the transmitted PUSCH is located.

The second TRP is one or more other TRPs in the multiple TRPs that are different from the first TRP.

According to embodiments, in response to the subcarrier spacing corresponding to the active BWP of the carrier for reporting the PHR MAC-CE being smaller than the subcarrier spacing corresponding to the active BWP of the carrier where the PUSCH is transmitted, the configuring unit 201 is configured to configure the terminal to measure respectively actual PHs when the PUSCHs are transmitted respectively for the first TRP and the second TRP on respective first transmission occasions among multiple coincident transmission occasions between different carriers, or measure respectively actual PHs when the PUSCHs are transmitted respectively for the first TRP and the second TRP on multiple coincident transmission occasions between different carriers.

Or, in response to the subcarrier spacing corresponding to the active BWP of the carrier for reporting the PHR MAC-CE being equal to the subcarrier spacing corresponding to the active BWP of the carrier where the PUSCH is transmitted, the configuring unit 201 is configured to configure the terminal to measure respectively multiple actual PHs when the PUSCHs are transmitted respectively for the multiple TRPs on respective first transmission occasions.

According to embodiments, the single PH in the PHR is one of:

- a measured PH corresponding a first TRP by default or by predefined;
- a measured PH corresponding to a TRP using a first transmission occasion by default or by predefined;
- a measured PH according to a TRP selected by the terminal where a PHR is lower than a PHR threshold;
- a PH corresponding to a TRP determined according to positive and negative values, and absolute values of PHs measured for the multiple TRPs;
- an actual PH measured corresponding to a TRP actually transmitting the PUSCH when there are actual PHR and virtual PHR in the multiple TRPs at the same time; or
- a PH measured according to a TRP configured or indicated by a network.

According to embodiments, the configuring unit 201 is configured to configure the terminal to determine the TRP according to the positive and negative values, and the absolute values of the PHs measured for the multiple TRPs by:

- in response to the PHs measured for the multiple TRPs includes a single negative value, configuring the terminal to use a TRP corresponding to the single negative value as the TRP of the single PH in the PHR;
- in response to the PHs measured for the multiple TRPs being all negative values, configuring the terminal to use a TRP with a largest PH absolute value as the TRP of the single pH in the PHR; or
- in response to the PHs measured for the multiple TRPs being all positive values, configuring the terminal to use a TRP with a smallest PH absolute value as the TRP of the single pH in the PHR.

With respect to the apparatuses according to the above embodiments, the specific manners for performing operations for individual modules therein have been described in detail according to the embodiments regarding the methods, which will not be elaborated herein.

Figure 14:
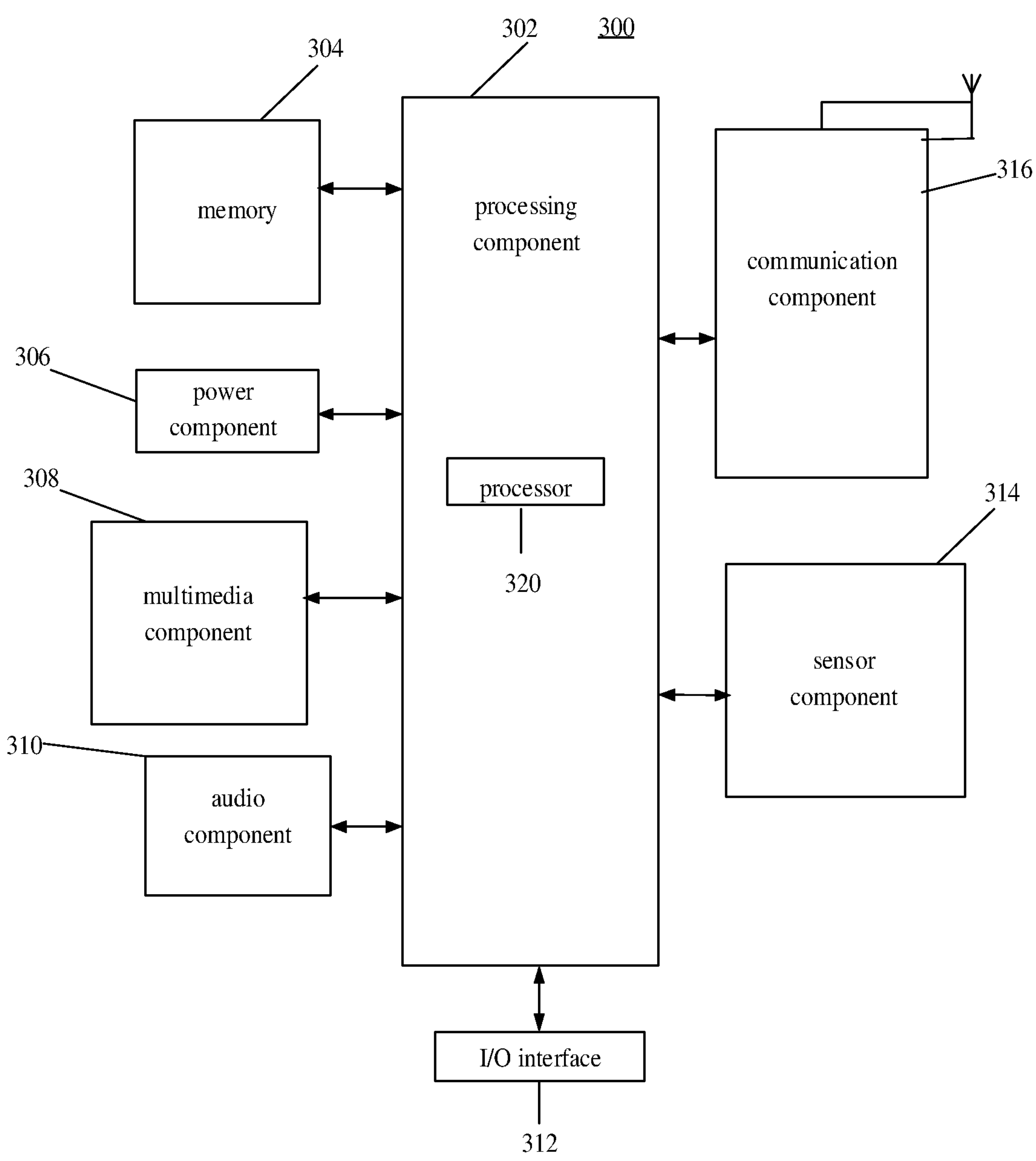
FIG. 14 is a block diagram of a device for reporting a PHR according to some embodiments.

FIG. 14 is a block diagram of a device for reporting a PHR according to some embodiments. For example, the device 300 may be a mobile phone, a computer, a digital broadcast terminal, a messaging device, a gaming console, a tablet, a medical device, exercise equipment, a personal digital assistant, and the like.

Referring to FIG. 14, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as Wi-Fi™, 2G, or 3G, or a combination thereof. According to some embodiments, the communication component 316 receives a broadcast signal or broadcast associated information from an external broadcast management system via a broadcast channel. According to some embodiments, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

According to some embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

According to some embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

Figure 15:
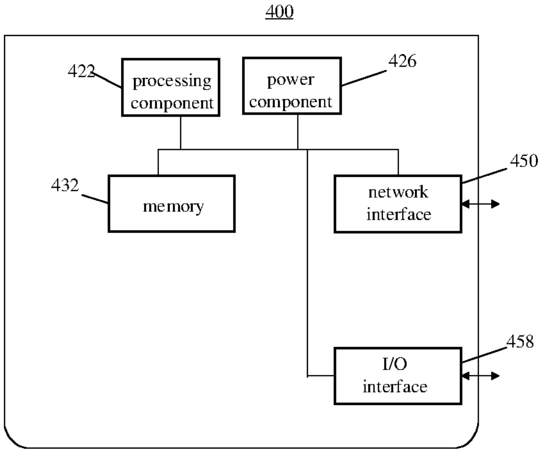
FIG. 15 is a block diagram of a device for reporting a PHR according to some embodiments.

FIG. 15 is a block diagram of a device for reporting a PHR according to some embodiments. For example, the device 400 may be a network device. Referring to FIG. 15, the device 400 includes a processing component 422, which further includes one or more processors, and a memory resource represented by a memory 432 for storing instructions executable by the processing component 422, such as application programs. The application program stored in the memory 432 may include one or more modules each corresponding to a set of instructions. In addition, the processing component 422 is configured to execute instructions to perform the above method.

The device 400 may also include a power component 426 configured to perform power management of the device 400, a wired or wireless network interface 450 configured to connect the device 400 to the network, and an I/O interface 458. The device 400 may operate based on an operating system stored in the memory 432, such as Windows Server™, Mac OS X™, Unix™, Linux™, FreeBSD™ or the like.

According to some embodiments, there is also provided a non-transitory computer-readable storage medium including instructions, such as the memory 432 including instructions that may be executed by the processing component 422 of the device 400 to implement the above method. For example, the non-transitory computer-readable storage medium may be a ROM, a RAM, a CD-ROM, a magnetic tape, a floppy disk, an optical data storage device, or the like.

It should be understood that "several" mentioned in the disclosure may refer to one or more, and "plurality" or "multiple" may refer to two or more. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship.

It should be further understood that the terms "first", "second", etc. are used to describe various information, but the information should not be limited to these terms. These terms are only used to distinguish information of the same type from one another, and do not imply a specific order or degree of importance. In fact, expressions such as "first" and "second" may be used interchangeably. For example, without departing from the scope of the disclosure, first information may also be called second information, and similarly, second information may also be called first information.

It should be further understood that although operations are described in a specific order in the drawings according to the embodiments of the disclosure, it should not be understood as requiring that these operations be performed in the specific order illustrated or in a serial order, or that perform all operations illustrated to obtain the desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for reporting a power headroom report (PHR), performed by a terminal, the method comprising:

transmitting cooperatively physical uplink shared channels (PUSCHs) towards multiple transmission reception points (TRPs);

measuring a power headroom (PH) on one or more cooperative TRPs; and reporting the PHR on the one or more cooperative TRPs according to the PH on the one or more cooperative TRPs;

wherein measuring the PH on the one or more cooperative TRPs comprises:

determining that the terminal does not transmit a PUSCH actually, and measuring a virtual PH of the PUSCH according to a default or predefined reference format corresponding to a single TRP or multiple TRPs as a calculation assumption;

wherein reporting the PHR on the one or more cooperative TRPs according to the PH on the one or more cooperative TRPs comprises:

reporting the PHR comprising the virtual PH corresponding to the PUSCH.

2. The method according to claim 1, wherein reporting the PHR comprises:

determining a PUSCH reference format according to a reference cooperative transmission mode corresponding to transmitting cooperatively the PUSCHs towards the multiple TRPs; and reporting the PHR comprising the virtual PH corresponding to the PUSCH according to the PUSCH reference format.

3. The method according to claim 1, wherein measuring the PH on the one or more cooperative TRPs comprises:

determining that the terminal schedules actually a single TRP to transmit a PUSCH, and measuring an actual PH when the PUSCH is transmitted on a designated transmission occasion; wherein reporting the PHR on the one or more cooperative TRPs according to the PH on the one or more cooperative TRPs comprises:

reporting the PHR comprising the actual PH.

4. The method according to claim 3, wherein in response to that a PUSCH for carrying a PHR medium access control-control element (MAC-CE) and the actually scheduled PUSCH are located on a same carrier, the designated transmission occasion comprises:

a first transmission occasion for PUSCH transmissions, a corresponding earliest transmission occasion for transmitting the scheduled PUSCH in a slot overlapping with the PUSCH for carrying the PHR MAC-CE, a transmission occasion corresponding to an earliest slot to be transmitted in one or more slots for the scheduled PUSCH where the one or more slots overlaps with multiple slots corresponding to a nominal transmission occasion of a PUSCH configured with repetition type B for carrying the PHR MAC-CE, multiple transmission occasions corresponding to multiple slots for the scheduled PUSCH where the multiple slots overlaps with multiple slots corresponding to a nominal transmission occasion of a PUSCH configured with repetition type B for carrying the PHR MAC-CE, or one or more predefined transmission occasions before a slot for reporting the PHR MAC-CE; and in response to that the PUSCH for carrying the PHR MAC-CE and the actually scheduled PUSCH are located on different carriers, the designated transmission occasion is determined according to a subcarrier spacing corresponding to an active bandwidth part (BWP) of a carrier for reporting the PHR MAC-CE and a subcarrier spacing corresponding to an active BWP of a carrier where the PUSCH is transmitted.

5. The method according to claim 4, wherein the designated transmission occasion is determined according to the subcarrier spacing corresponding to the active BWP of the carrier for reporting the PHR MAC-CE and the subcarrier spacing corresponding to the active BWP of the carrier where the PUSCH is transmitted, comprises:

in response to the subcarrier spacing corresponding to the active BWP of the carrier for reporting the PHR MAC-CE being smaller than the subcarrier spacing corresponding to the active BWP of the carrier where the PUSCH is transmitted, the designated transmission occasion comprising:

a first transmission occasion for PUSCH transmissions;

an earliest transmission occasion to be transmitted among transmission occasions for the scheduled PUSCH in a slot overlapping with the PUSCH for carrying the PHR MAC-CE;

multiple transmission occasions for the scheduled PUSCH corresponding to a slot overlapping with the PUSCH for carrying the PHR MAC-CE;

a transmission occasion corresponding to an earliest slot to be transmitted in one or more slots for the scheduled PUSCH where the one or more slots overlaps with multiple slots corresponding to a nominal transmission occasion of a PUSCH configured with repetition type B for carrying the PHR MAC-CE;

multiple transmission occasions corresponding to multiple slots for the scheduled PUSCH where the multiple slots overlaps with multiple slots corresponding to a nominal transmission occasion of a PUSCH configured with repetition type B for carrying the PHR MAC-CE; or one or more predefined transmission occasions before a slot of the PUSCH for carrying the PHR MAC-CE.

6. The method according to claim 4, wherein the designated transmission occasion is determined according to the subcarrier spacing corresponding to the active BWP of the carrier for reporting the PHR MAC-CE and the subcarrier spacing corresponding to the active BWP of the carrier where the PUSCH is transmitted, comprises:

in response to the subcarrier spacing corresponding to the active BWP of the carrier for reporting the PHR MAC-CE being equal to the subcarrier spacing corresponding to the active BWP of the carrier where the PUSCH is transmitted, the designated transmission occasion comprising:

a first transmission occasion for PUSCH transmissions;

an earliest transmission occasion among transmission occasions overlapping with a slot for reporting the PHR MAC-CE;

a transmission occasion corresponding to an earliest slot to be transmitted in one or more slots for the scheduled PUSCH where the one or more slots overlaps with multiple slots corresponding to a nominal transmission occasion of a PUSCH configured with repetition type B for carrying the PHR MAC-CE;

multiple transmission occasions corresponding to multiple slots for the scheduled PUSCH where the multiple slots overlaps with multiple slots corresponding to a nominal transmission occasion of a PUSCH configured with repetition type B for carrying the PHR MAC-CE; or one or more predefined transmission occasions before a slot for reporting the PHR MAC-CE.

7. The method according to claim 3, wherein reporting the PHR comprises:

reporting the PHR comprising a single actual PH.

8. The method according to claim 1, wherein measuring the PH on the one or more cooperative TRPs comprises:

determining to transmit cooperatively the PUSCHs towards the multiple TRPs, and measuring respectively multiple PHs corresponding to designated transmission occasions transmitted towards the multiple TRPs;

wherein reporting the PHR on the one or more cooperative TRPs according to the PH on the one or more cooperative TRPs comprises:

reporting the PHR comprising a single PH or multiple PHs.

9. The method according to claim 8, wherein in response to that a PUSCH for carrying a PHR MAC-CE and an actually scheduled PUSCH are located on a same carrier, measuring respectively the multiple PHs corresponding to the designated transmission occasions transmitted towards the multiple TRPs, comprises:

measuring respectively multiple actual PHs after transmitting respectively the PUSCHs on respective first transmission occasions corresponding to the multiple TRPs;

in a slot overlapping with the PUSCH for carrying the PHR MAC-CE, measuring on respective earliest transmission occasions to be transmitted in transmission occasion groups corresponding to different TRPs for scheduling the PUSCHs, to obtain multiple actual PHs;

in a slot overlapping with multiple-slot transmissions corresponding to a nominal transmission occasion of a PUSCH configured with repetition type B for carrying the PHR MAC-CE, measuring on respective earliest transmission occasions to be transmitted in transmission occasion groups corresponding to different TRPs, to obtain multiple actual PHs;

in a slot overlapping with multiple-slot transmissions corresponding to a nominal transmission occasion of a PUSCH configured with repetition type B for carrying the PHR MAC-CE, measuring on multiple transmission occasions in respective transmission occasion groups corresponding to different TRPs, to obtain multiple actual PHs;

measuring respectively after transmitting respectively the PUSCHs on respective predefined transmission occasions corresponding to different TRPs before a slot for reporting the PHR MAC-CE corresponding to the multiple TRPs to obtain multiple actual PHs; or measuring respectively after transmitting respectively the PUSCHs on respective predefined transmission occasions corresponding to different TRPs after a slot for reporting the PHR MAC-CE corresponding to the multiple TRPs to obtain multiple virtual PHs.

10. The method according to claim 8, wherein measuring respectively the multiple PHs corresponding to the designated transmission occasions transmitted towards multiple TRPs comprises:

in response to that a PUSCH for carrying a PHR MAC-CE and an actually scheduled PUSCH are located on different carriers, measuring an actual PH after the PUSCH is transmitted on a transmission occasion corresponding to a first TRP in and/or before a slot where the PUSCH is transmitted, and measuring an actual PH after the PUSCH is transmitted in a predefined slot corresponding to a second TRP in and/or before a slot where the PUSCH is transmitted;

in response to that a PUSCH for carrying a PHR MAC-CE and an actually scheduled PUSCH are located on different carriers, measuring an actual PH after the PUSCH is transmitted on a transmission occasion corresponding to a first TRP in and/or before a slot where the PUSCH is transmitted, measuring an actual PH after the PUSCH is transmitted in a predefined slot corresponding to a second TRP in and/or before a slot where the PUSCH is transmitted, and using the PH measured for the second TRP before the slot the PUSCH is transmitted as an actual PH after transmitting the PUSCH in a predefined slot after the slot where the PUSCH is transmitted;

in response to that a PUSCH for carrying a PHR MAC-CE and an actually scheduled PUSCH are located on different carriers, measuring an actual PH after the PUSCH is transmitted on a transmission occasion for a first TRP in and/or before a slot where the PUSCH is transmitted, and measuring a virtual PH for a second TRP in a predefined slot after a slot where the PUSCH is transmitted; or measuring an actual PH after the PUSCH is transmitted in a slot for a second TRP where the PUSCH is transmitted, and measuring a virtual PH for a first TRP in a predefined slot after a slot where the PUSCH is transmitted; or in response to that a PUSCH for carrying a PHR MAC-CE and an actually scheduled PUSCH are located on different carriers, measuring respectively the multiple PHs after the PUSCHs are transmitted respectively on the respective transmission occasions for the multiple TRPs according to a subcarrier spacing corresponding to an active BWP of a carrier for reporting the PHR MAC-CE and a subcarrier spacing corresponding to an active BWP of a carrier where the transmitted PUSCH is located;

wherein the second TRP is one or more other TRPs in the multiple TRPs that are different from the first TRP.

11. The method according to claim 10, wherein measuring respectively the multiple PHs after the PUSCHs are transmitted respectively on the respective transmission occasions for the multiple TRPs according to the subcarrier spacing corresponding to the active BWP of the carrier for reporting the PHR MAC-CE and the subcarrier spacing corresponding to the active BWP of the carrier where the transmitted PUSCH is located comprises:

in response to the subcarrier spacing corresponding to the active BWP of the carrier for reporting the PHR MAC-CE being smaller than the subcarrier spacing corresponding to the active BWP of the carrier where the PUSCH is transmitted, measuring respectively actual PHs when the PUSCHs are transmitted respectively for the first TRP and the second TRP on respective first transmission occasions among multiple coincident transmission occasions between different carriers, or measuring respectively actual PHs when the PUSCHs are transmitted respectively for the first TRP and the second TRP on multiple coincident transmission occasions between different carriers; or in response to the subcarrier spacing corresponding to the active BWP of the carrier for reporting the PHR MAC-CE being equal to the subcarrier spacing corresponding to the active BWP of the carrier where the PUSCH is transmitted, measuring respectively multiple actual PHs when the PUSCHs are transmitted respectively for the multiple TRPs on respective first transmission occasions.

12. The method according to claim 8, wherein the single PH in the PHR is one of:

a measured PH corresponding a first TRP by default or by predefined;

a measured PH corresponding to a TRP using a first transmission occasion by default or by predefined;

a measured PH according to a TRP selected by the terminal where a PHR is lower than a PHR threshold;

a PH corresponding to a TRP determined according to positive and negative values, and absolute values of PHs measured for the multiple TRPs;

an actual PH measured corresponding to a TRP actually transmitting the PUSCH when there are actual PHR and virtual PHR in the multiple TRPs at the same time; or a PH measured according to a TRP configured or indicated by a network.

13. The according to claim 12, wherein the TRP determined according to the positive and negative values, and the absolute values of the PHs measured for the multiple TRPs comprises:

in response to the PHs measured for the multiple TRPs comprises a single negative value, using a TRP corresponding to the single negative value as the TRP of the single PH in the PHR;

in response to the PHs measured for the multiple TRPs being all negative values, using a TRP with a largest PH absolute value as the TRP of the single pH in the PHR; or in response to the PHs measured for the multiple TRPs being all positive values, using a TRP with a smallest PH absolute value as the TRP of the single pH in the PHR.

14. A method for reporting a power headroom report (PHR), performed by a network device, the method comprising:

configuring a terminal to transmit cooperatively physical uplink shared channels (PUSCHs) towards multiple transmission reception points (TRPs);

configuring the terminal to measure a power headroom (PH) on one or more cooperative TRPs and report the PHR on the one or more cooperative TRPs according to the PH on the one or more cooperative TRPs; and obtaining the PHR on the one or more cooperative TRPs, reported by the terminal;

wherein configuring the terminal to measure and report the PHR on the one or more cooperative TRPs comprises:

in response to that the terminal does not transmit a PUSCH actually, configuring the terminal to measure a virtual PH of the PUSCH according to a default or predefined reference format corresponding to a single TRP or multiple TRPs as a calculation assumption, and configuring the terminal to report the PHR comprising the virtual PH corresponding to the PUSCH;

wherein configuring the terminal to report the PHR comprising the virtual PH corresponding to the PUSCH comprises:

configuring the terminal to determine a PUSCH reference format according to a reference cooperative transmission mode corresponding to transmitting cooperatively the PUSCHs towards the multiple TRPs; and configuring the terminal to report the PHR comprising the virtual PH corresponding to the PUSCH according to the PUSCH reference format.

15. The method according to claim 14, wherein configuring the terminal to measure and report the PHR on the one or more cooperative TRPs comprises:

in response to that the terminal schedules actually a single TRP to transmit a PUSCH, configuring the terminal to measure an actual PH when the PUSCH is transmitted on a designated transmission occasion, and report the PHR comprising the actual PH, in response to that a PUSCH for carrying a PHR medium access control-control element (MAC-CE) and the actually scheduled PUSCH are located on a same carrier, the designated transmission occasion comprises one of:

a first transmission occasion for PUSCH transmissions, a corresponding earliest transmission occasion for transmitting the scheduled PUSCH in a slot overlapping with the PUSCH for carrying the PHR MAC-CE, a transmission occasion corresponding to an earliest slot to be transmitted in one or more slots for the scheduled PUSCH where the one or more slots overlaps with multiple slots corresponding to a nominal transmission occasion of a PUSCH configured with repetition type B for carrying the PHR MAC-CE, multiple transmission occasions corresponding to multiple slots for the scheduled PUSCH where the multiple slots overlap with multiple slots corresponding to a nominal transmission occasion of a PUSCH configured with repetition type B for carrying the PHR MAC-CE, or one or more predefined transmission occasions before a slot for reporting the PHR MAC-CE; and in response to that the PUSCH for carrying the PHR MAC-CE and the actually scheduled PUSCH are located on different carriers, the designated transmission occasion is determined according to a subcarrier spacing corresponding to an active bandwidth part (BWP) of a carrier for reporting the PHR MAC-CE and a subcarrier spacing corresponding to an active BWP of a carrier where the PUSCH is transmitted.

16. The method according to claim 14, wherein configuring the terminal to measure the PH on the one or more cooperative TRPs and report the PHR on the one or more cooperative TRPs according to the PH on the one or more cooperative TRPs comprises:

configuring the terminal to measure respectively multiple PHs of the multiple TRPs on designated transmission occasions, and report the PHR comprising a single PH or multiple PHs.

17. A device for reporting a power headroom report (PHR), comprising:

a processor; and a memory for storing processor-executable instructions;

wherein the processor is configured to perform the method according to claim 14.

18. A device for reporting a power headroom report (PHR), comprising a processor; and a memory for storing processor-executable instructions;

wherein the processor is configured to:

transmit cooperatively physical uplink shared channels (PUSCHs) towards multiple transmission reception points (TRPs);

measure a power headroom (PH) on one or more cooperative TRPs; and report the PHR on the one or more cooperative TRPs according to the PH on the one or more cooperative TRPs;

wherein the processor is further configured to:

determine that the terminal does not transmit a PUSCH actually, measure a virtual PH of the PUSCH according to a default or predefined reference format corresponding to a single TRP or multiple TRPs as a calculation assumption;

wherein the processor is further configured to:

report the PHR comprising the virtual PH corresponding to the PUSCH.

* * * * *